US007220695B2

(12) United States Patent
Casty et al.

(10) Patent No.: US 7,220,695 B2
(45) Date of Patent: May 22, 2007

(54) SUPPORTED ACTIVATOR

(75) Inventors: Gary L. Casty, League City, TX (US); Smita Kacker, Houston, TX (US); Jack W. Johnson, Clinton, NJ (US); Murielle V. Scott, Houston, TX (US); Steven L. Hegwood, Spring, TX (US); Robert R. Simpson, Scott Plains, NJ (US); Robert P. Reynolds, Clinton, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 248 days.

(21) Appl. No.: 10/753,153

(22) Filed: Jan. 7, 2004

(65) Prior Publication Data
US 2005/0148743 A1 Jul. 7, 2005

(51) Int. Cl.
C08F 4/02 (2006.01)
C08F 4/64 (2006.01)
C08F 4/6392 (2006.01)
(52) U.S. Cl. ............... 502/120; 502/103; 502/123; 502/128; 502/152; 502/114; 526/129; 526/141; 526/144; 526/160; 526/165; 526/943
(58) Field of Classification Search ............... 502/120, 502/152, 103, 123, 128, 114; 526/129, 141, 526/144, 160, 165, 943
See application file for complete search history.

(56) References Cited

U.S. PATENT DOCUMENTS

| 5,308,811 | A | 5/1994 | Suga et al. ............... 502/62 |
| 5,928,928 | A | 7/1999 | Aerts ............... 435/201 |
| 5,973,084 | A | 10/1999 | Suga et al. ............... 526/129 |
| 6,040,261 | A | 3/2000 | Hlatky ............... 502/117 |
| 6,048,817 | A | 4/2000 | Sagae et al. ............... 502/117 |
| 6,147,173 | A | 11/2000 | Holtcamp ............... 526/133 |
| 6,211,105 | B1 | 4/2001 | Holtcamp ............... 502/103 |
| 6,239,062 | B1 | 5/2001 | Cribbs ............... 502/167 |
| 6,353,063 | B1 | 3/2002 | Shimizu et al. ............... 526/74 |
| 6,376,416 | B1 | 4/2002 | Hirakawa et al. ............... 502/120 |
| 6,376,629 | B2 | 4/2002 | Nagy et al. ............... 526/161 |
| 6,395,846 | B1 | 5/2002 | Sato et al. ............... 526/92 |
| 6,414,162 | B1 | 7/2002 | Nagy ............... 548/406 |
| 6,451,724 | B1 | 9/2002 | Nifant'ev et al. ............... 502/103 |
| 6,489,480 | B2 | 12/2002 | Rodriguez ............... 546/192 |
| 6,531,552 | B2 | 3/2003 | Nakano et al. ............... 526/127 |
| 6,703,338 | B2* | 3/2004 | Holtcamp et al. ............... 502/123 |
| 6,841,501 | B2 | 1/2005 | Resconi et al. |
| 6,858,689 | B2 | 2/2005 | Holtcamp et al. |
| 6,869,903 | B2 | 3/2005 | Matsunaga |
| 6,884,748 | B2 | 4/2005 | McCullough |
| 6,894,131 | B2 | 5/2005 | McCullough et al. |
| 2002/0038036 | A1 | 3/2002 | Resconi et al. ............... 548/402 |
| 2003/0027950 | A1 | 2/2003 | Uchino et al. ............... 526/90 |
| 2003/0104928 | A1 | 6/2003 | Holtcamp ............... 502/103 |
| 2003/0171211 | A1 | 9/2003 | Holtcamp ............... 502/152 |
| 2004/0127348 | A1 | 7/2004 | Holtcamp et al. |
| 2004/0236045 | A1 | 11/2004 | Matsunaga |
| 2005/0075242 | A1 | 4/2005 | Holtcamp et al. |
| 2005/0165183 | A1 | 7/2005 | McCullough et al. |
| 2005/0182210 | A1 | 8/2005 | Muruganandam et al. |

FOREIGN PATENT DOCUMENTS

| EP | 0511665 A2 | 4/1992 |
| EP | 0511665 B1 | 4/1992 |
| EP | 0 849 292 | 6/1998 |
| EP | 1160261 A1 | 5/2001 |
| EP | 0 849 292 | 8/2002 |
| JP | 05025214 A | 2/1993 |
| JP | 11166011 A | 6/1999 |
| JP | 11166012 A | 6/1999 |
| JP | 2001-026613 A | 7/1999 |
| JP | 2001-031720 A | 7/1999 |
| JP | 11255816 A | 9/1999 |
| JP | 2000-198812 A | 11/1999 |
| JP | 2000-072813 A | 3/2000 |
| JP | 2001-163908 A | 6/2001 |
| JP | 2001-163909 A | 6/2001 |
| JP | 2001-20010 A | 7/2001 |
| JP | 2001-316414 A | 11/2001 |
| JP | 2001-316415 A | 11/2001 |
| JP | 2002-020415 A | 1/2002 |
| JP | 2002-037812 A | 2/2002 |
| JP | 2002-060411 A | 2/2002 |
| JP | 2002-069116 A | 3/2002 |
| JP | 2002-0253486 A | 9/2002 |
| WO | WO 00/11044 A1 | 2/2000 |

(Continued)

OTHER PUBLICATIONS

R.E. Lapointe, G.R. Roof, K.A. Abboud, J. Klosin, J. Am. Chem. Soc 2000, 122, 9560-9561.

(Continued)

Primary Examiner—Caixia Lu
(74) Attorney, Agent, or Firm—Catherine L. Bell

(57) ABSTRACT

This invention relates to supported activators comprising the product of the combination of an ion-exchange layered silicate, an organoaluminum compound, and a heterocyclic compound, which may be substituted or unsubstituted. This invention further relates to catalyst systems comprising catalyst compounds and such activators, as well as processes to polymerize unsaturated monomers using the supported activators.

For the purposes of this patent specification and the claims thereto, the term "activator" is used interchangeably with the term "co-catalyst", the term "catalyst" refers to a metal compound that when combined with an activator polymerizes olefins, and the term "catalyst system" refers to the combination of a catalyst and an activator with or without a support. The terms "support" or "carrier", for purposes of this patent specification, are used interchangeably and are any ion-exchange layered silicates.

35 Claims, No Drawings

FOREIGN PATENT DOCUMENTS

| WO | 2000-22010 A1 | 4/2000 |
|---|---|---|
| WO | WO 01-30864 A1 | 3/2001 |
| WO | 01/23442 | 4/2001 |
| WO | 2001-23442 A1 | 4/2001 |
| WO | WO 01/23440 A1 | 4/2001 |
| WO | WO 0125149 A2 * | 4/2001 |
| WO | WO 01/42320 A1 | 6/2001 |
| WO | WO2002/102811 | 12/2002 |
| WO | WO2003/064433 | 8/2003 |
| WO | WO 2003/064433 A1 | 8/2003 |
| WO | WO 2003/064435 A1 | 8/2003 |
| WO | 2004-003031 | 1/2004 |
| WO | 2004/003031 | 1/2004 |

OTHER PUBLICATIONS

G. Hehr, R. Frohlich, B. Wibbeling, G. Erker, Chem. Eur. J. 2000, 6, No. 2, 258-266.

U.S. Appl. No. 11/514,007, filed Aug. 31, 2006, inventor Gary L. Casty et al., entitled Preparation Of Polymerization Catalyst Activators Utilizing Indole-Modified Silica Supports (2004B002A).

* cited by examiner

SUPPORTED ACTIVATOR

STATEMENT OF RELATED CASES

This application relates to U.S. Ser. No. 10/186,361 filed Jun. 28, 2002, now U.S. Pat. No. 6,703,338.

FIELD OF THE INVENTION

The present invention relates to supported activator systems, to polymerization catalyst systems containing these activator systems and to polymerization processes utilizing the same. In particular, this invention relates to activator systems comprising an ion-exchange layered silicate, an organoaluminum compound, and a heterocyclic compound, which may or may not be substituted.

BACKGROUND OF THE INVENTION

Metallocene olefin polymerization catalyst systems typically use an activator (also called a co-catalyst) to generate the active catalytic species. In general, there are two catalyst activator families: partially hydrolyzed aluminum alkyl complexes and non-coordinating anions (NCA's). Some of the most commonly employed activators used today are the partially hydrolyzed aluminum alkyls, more specifically, alumoxanes, such as methylalumoxane (MAO). In general, metallocene olefin polymerization systems that utilize NCA-type activators are more active than their MAO counterparts, but are also quite costly and much more sensitive to poisons which present a problem in catalyst synthesis, handling, storage and reactor operation. Alternatively, MAO-based systems are more robust than their NCA-type counterparts, but they suffer from the high cost of MAO production, the fact that MAO is typically used in large excess (relative to the amount of metallocene) and the limited shelf life of MAO.

In order to enhance polymer morphology, metallocene polymerization catalysts operated in industrial slurry and gas phase processes are typically immobilized on a carrier or a support, such as alumina or silica. Metallocenes are supported to enhance the morphology of the forming polymeric particles such that they achieve a shape and density that improves reactor operability and ease of handling. However, the supported versions of metallocene polymerization catalysts tend to have lower activity as compared to their homogeneous counterparts. In general, metallocene and single-site catalysts are immobilized on silica supports.

Alternative supports for metallocene and single-site catalysts have been the subject of numerous ongoing research projects. In particular, metallocenes supported on clay or ion-exchanged layered compounds have generated a great deal of interest. Olefin polymerization catalysts using clay, clay mineral or acid/salt-treated (or a combination of both) ion-exchange layered compounds, an organoaluminum compound and a metallocene as components have been reported (see EP 0,511,665A2; EP 0,511,665B1; and U.S. Pat. No. 5,308,811). Likewise, U.S. Pat. No. 5,928,982 and U.S. Pat. No. 5,973,084 report olefin polymerization catalysts containing an acid or salt-treated (or a combination of both) ion exchange layered silicate, containing less than 1% by weight water, an organoaluminum compound and a metallocene. Furthermore, WO 01/42320 A1 discloses combinations of clay or clay derivatives as a catalyst support, an activator comprising any Group 1-12 metal or Group 13 metalloid, other than organoaluminum compound, and a Group 3-13 metal complex. Also, U.S. Pat. No. 6,531,552B2 and EP 1,160,261A1 report an olefin polymerization catalyst of an ion-exchange layered compound having particular acid strength and acid site densities. US2003/0027950 A1 reports an olefin polymerization catalyst utilizing ion-exchange layered silicates with a specific pore size distribution and having a carrier strength within a specific range.

Likewise, alternative activators for metallocenes and other single-site polymerization catalysts have been the subject of numerous research efforts in recent years. For example, perfluorophenyl aluminum and borane complexes containing one anionic nitrogen-containing group may activate metallocenes. For example, R. E. Lapointe, G. R. Roof, K. A. Abboud, J. Klosin, J. Am. Chem. Soc. 2000, 122, 9560-9561, and WO 01/23442 A1 report the synthesis of $(C_6F_5)_3Al(imidazole)[Al(C_6F_5)_3][HNR'R'']$. In addition, G. Kehr, R. Frohlich, B Wibbeling, G. Erker, Chem. Eur. J. 2000, 6, No.2, 258-266 report the synthesis of (N-Pyrrolyl)$B(C_6F_5)_2$. Supported activatores containing a Group 13 element and at least one halogenated, nitrogen-containing aromatic group ligand for polymerization catalysts have been reported (U.S. Pat. No. 6,147,173 and U.S. Pat. No. 6,211,105).

Other references of interest include: US 2003-104928, WO 2003/064433, U.S. Pat. No. 6,489,480, US 2002-038036, WO 2002/102811, U.S. Pat. No. 6,414,162, U.S. Pat. No. 6,040,261, U.S. Pat. No. 6,239,062, U.S. Pat. No. 6,376,629, U.S. Pat. No. 6,451,724, JP 2002-069116A, JP 2002-0253486A, US 2003-0027950A1, JP 2002-037812A, JP 2002-020415A, JP 2002-060411A, JP 2001-316415A, JP 2001-316414A, U.S. Pat. No. 6,531,552, JP 2001-200010A, JP 2001-163909A, JP 2001163908A, WO 2001-30864A1, JP 2001-026613A, JP 2001-031720A, JP 2000-198812A, WO 2000/22010A1, JP 2000072813A, WO 2000/11044A1, U.S. Pat. No. 6,353,063, U.S. Pat. No. 6,376,416, JP 11255816A(1999-09-21), JP 11166012A(1999-06-22), JP 1116601A(1999-06-22), U.S. Pat. No. 6,048,817, JP 05025214A(1993-02-02), WO 2003/064433A1, and WO 2003/0644435A1.

Given the high cost, low stability and reduced activity of MAO-based metallocene polymerization systems, there is a need in the art for new inexpensive, stable and supportable polymerization catalyst activator compounds.

SUMMARY OF THE INVENTION

This invention relates to supported activators comprising the product of the combination of an ion-exchange layered silicate, an organoaluminum compound, and a heterocyclic compound, which may be substituted or unsubstituted. This invention further relates to catalyst systems comprising catalyst compounds and such activators, as well as processes to polymerize unsaturated monomers using the supported activators.

For the purposes of this patent specification and the claims thereto, the term "activator" is used interchangeably with the term "co-catalyst", the term "catalyst" refers to a metal compound that when combined with an activator polymerizes olefins, and the term "catalyst system" refers to the combination of a catalyst and an activator with or without a support. The terms "support" or "carrier", for purposes of this patent specification, are used interchangeably and are any ion-exchange layered silicates.

DETAILED DESCRIPTION

This invention relates to supported activators comprising the product of the combination of an ion-exchange layered silicate, an organoaluminum compound, and a heterocyclic compound, which may be substituted or unsubstituted.

Preferred ion-exchange layered silicate useful in the present invention are silicate compounds having a crystal structures wherein layers formed by strong ionic and covalent bonds are laminated in parallel with weak ionic bonding, and the ions contained between the layers are exchangeable. Most ion-exchange layered silicates naturally occur as the main component of clay minerals, but these ion-exchange layered silicates may be artificially synthesized materials. Preferred ion-exchange layered silicates useful in this invention include natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials (such as ITQ-2, MCM-22, and ferrierite precursors) and mixtures thereof. In a preferred embodiment the ion-exchange layered silicate is acidified by contacting with an acid (such as sulfuric acid, hydrochloric acid, a carboxylic acid, an amino acid, or the like.)

Preferred ion-exchange layered silicates useful in this invention include those having a 1:1 type structure or a 2:1 type structure. Examples of the ion-exchange layered silicate include layered silicates having a 1:1 type structure or a 2:1 type structure as described in "Clay Mineralogy" written by R. E. Grim (published by McGraw Hill in 1968) and "Chemistry of Clays and Clay Minerals" written by A. C. Newman (published by John Wiley and Sons: New York in 1987). The 1:1 type structure is a structure formed by laminating 1:1 layered structures having one layer of tetrahedral sheet and one layer of octahedral sheet combined as described in the above literature "Clay Mineralogy", and the 2:1 type structure is a structure formed by laminating 2:1 layered structures having one layer of octahedral sheet sandwiched between two layers of tetrahedral sheets. Examples of ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizardite, antigorite or the like. Examples of ion-exchange layered silicate comprising the 2:1 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. Mixed layer silicates are also included. In some embodiments, an ion-exchange layered silicate having the 2:1 type structure is preferable. In another preferred embodiment, a smectite group silicate is used and in a particularly preferable example the ion exchange layered silicate comprises montmorillonite.

Kinds of exchangeable cations (a cation contained between layers of an ion-exchange layered silicate) are not specially limited, but the cations are preferably a metal of Group 1 of the Periodic Table of the Elements such as sodium or potassium, a metal of Group 2 of the Periodic Table of the Elements such as calcium or magnesium, or a transition metal such as iron, cobalt, copper, nickel, zinc, ruthenium, rhodium, palladium, silver, iridium, platinum or gold, which are relatively easily available as industrial starting materials.

In some embodiments, the ion-exchange layered silicate has an average particle size of from 0.02 to 200 microns, preferably from 0.25 to 100 microns, even more preferably 0.5 to 50 microns. In some embodiments the ion exchange layered silicates have a bi-modal distribution, or even multi-modal distribution, of particle sizes.

The ion-exchange layered silicate may be used in a dry state, and may be used also in a slurry state in liquid. Also, the shape of the ion-exchange layered silicate is not specially limited, and the shape may be a naturally occurring shape, an artificially synthesized shape or a shape of an ion-exchange layered silicate obtained after subjected to pulverizing, granulating and classifying. Among these shapes, it is preferable to use a granulated ion-exchange layered silicate since such an ion-exchange layered silicate used as a catalyst component provides satisfactory polymer particle properties.

In some embodiments the ion-exchange layered silicates are used in the absence of other support type compounds. Likewise, in other embodiments the ion exchange layered silicates are combined with other support type compound and used in this invention. For example, an ion exchange layered silicate, such as montmorillonite, may be combined with silica then combined with the alkylaluminum and heterocyclic compound. In another embodiment, the ion-exchange layered silicate may be utilized as part of an agglomerate (as described in US 2003/0096698 A1 and U.S. Pat. No. 6,559,090 B1 and are herein fully incorporated by reference), with at least one inorganic oxide component selected from $SiO_2$, $Al_2O_3$, MgO, $AlPO_4$, $TiO_2$, $ZrO_2$, or $Cr_2O_3$.

Processing of a shape of an ion-exchange layered silicate by granulating, pulverizing or classifying may be carried out before chemical treatment (that is, the ion-exchange layered silicate having a shape previously processed may be subjected to the chemical treatment), or an ion-exchange layered silicate may be subjected to processing of a shape after chemical treatment. Processing may occur before or after chemical treatment with an organoaluminum compound and/or treatment with a heterocyclic compound (as described previously) and/or treatment with a polymerization catalyst.

Examples of a granulation method used herein include a stirring granulation method, a spraying granulation method, a tumbling granulation method, a bricketing granulation method, a compacting granulation method, an extruding granulation method, a fluidized layer granulation method, an emulsifying granulation method, a suspending granulation method a press-molding granulation method, and the like, but the granulation method is not limited thereto. Preferable examples include a stirring granulation method, a spraying granulation method, a tumbling granulation method and a fluidizing granulation method, and particularly preferable examples include a stirring granulation method and a spraying granulation method.

When carrying out the spraying granulation method, examples of a dispersion medium used for a starting slurry include water or an organic solvent such as methanol, ethanol, chloroform, methylene chloride, pentane, hexane, heptane, toluene, xylene or the like. Preferably, water is used as a dispersion medium. A concentration of the ion-exchange layered silicate in a starting material slurry for the spraying granulation method producing sphere particles is from 0.1 to 70%, preferably from 1 to 50 wt %, more preferably from 5 to 30 wt %. An entrance temperature of hot air used in the spraying granulation method producing sphere particles varies depending on a dispersion medium used, but it is from 80 to 260° C., preferably from 100 to 220° C., when water is used as a dispersion medium.

Also, in the granulation step, an organic material, an inorganic solvent, an inorganic salt, various binders and the like may be used. Examples of the binders include sugar, dextrose, corn syrup, gelatin, glue, carboxymethylcelluloses, polyvinyl alcohol, water-glass, magnesium chloride, aluminum sulfate, aluminum chloride, magnesium sulfate, alcohols, glycol, starch, casein, latex, polyethylene glycol, polyethylene oxide, tar, pitch, alumina sol, silica gel, gum arabic, sodium alginate, and the like.

Also, a particle size of a granulated ion-exchange layered silicate is in a range of from 0.1 to 1000 μm, preferably 1 to 500 μm is useful in this invention. Also, the pulverizing method is not specially limited, and it may be either dry type pulverization or wet type pulverization.

Chemical Treatment of Ion-Exchange Layered Silicate

The chemical treatment of an ion-exchange layered silicate is carried out by bringing it in contact with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called a guest. Among these treatments, acid treatment or salt treatment is particularly preferable.

A common effect achieved by chemical treatment is to exchange an intercalation cation with other cations, and in addition to this effect, the following various effects can be achieved by various chemical treatments. For example, acid treatment removes impurities on the surface of silicate, and cations such as Al, Fe, Mg or the like in a crystal structure are eluted, thereby increasing the surface area. This treatment enhances the acid strength and acidity of the layered silicate.

Alkali treatment destroys a crystal structure of a clay mineral, and changes a structure of the clay mineral. Also, intercalation or salt treatment forms an ion composite, a molecule composite, an organic derivative or the like, and changes a surface area or a distance between layers. By using an ion-exchange reaction, an exchangeable intercalated cation between layers can be replaced by other large bulky ions, thereby producing a layered material having the distance between layers enlarged. Thus, the bulky ions have a function as a column supporting the layered structure, and are called pillars.

Examples of treating agents are illustrated below. In the present invention, at least two kinds of members selected from the group consisting of acids, salts, alkalis, oxidizing agents, reducing agents and compounds intercalatable between layers of an ion-exchange layered silicate may be combined and used as treating agents. Also, acids, salts, alkalis, oxidizing agents, reducing agents and compounds intercalatable between layers of an ion-exchange layered silicate may be respectively used in a combination of two or more members. Among them, a combination of a salt treatment and an acid treatment is particularly preferable.

(A) Acids

An acid treatment removes impurities on the surface or ion-exchanges a cation present between layers, and in addition to this function, the acid treatment elutes a part or whole of cations such as Al, Fe, Mg or the like in a crystal structure. Examples of an acid used in acid treatment include hydrochloric acid, nitric acid, sulfuric acid, phosphoric acid, acetic acid, and oxalic acid and the like. Particularly, it is preferable to use an inorganic acid. Usually the acid is used in a form of an acid aqueous solution. The acid used in the treatment may be a mixture of at least two kinds of acids. In a preferred embodiment the acid used herein is sulfuric acid.

(B) Salts

Examples of salts include salts formed from a cation selected from the group consisting of an organic cation, an inorganic cation and a metal ion and anion selected from the group consisting of an organic anion, an inorganic anion and a halide ion. For example, preferable examples include compounds formed from a cation including at least one kind of atom selected from Group 1 to Group 14 of the Periodic Table of the Elements and at least one kind of an anion selected form an anion of halogen and an anion of an inorganic Bronsted acid and an organic Bronsted acid. Particularly preferable examples include compounds formed from an anion selected from the group consisting of an anion of halogen and an anion of an inorganic Bronsted acid.

Non-limiting examples of these salts include $LiCl$, $LiBr$, $Li_2SO_4$, $Li_3(PO_4)$, $LiNO_3$, $Li(OOCCH_3)$, $NaCl$, $NaBr$, $Na_2SO_4$, $Na_3(PO_4)$, $NaNO_3$, $Na(OOCCH_3)$, $KCl$, $KBr$, $K_2SO_4$, $K_3(PO_4)$, $KNO_3$, $K(OOCCH_3)$, $MgCl_2$, $MgSO_4$, $Mg(NO_3)_2$, $CaCl_2$, $CaSO_4$, $Ca(NO_3)_2$, $Ca_3(C_6H_5O_7)_2$, $Sc(OOCCH_3)_2$, $Sc_2(CO_3)_3$, $Sc_2(C_2O_4)_3$, $Sc(NO_3)_3$, $Sc_2(SO_4)_3$, $ScF_3$, $ScCl_3$, $ScBr_3$, $ScI_3$, $Y(OOCH_3)_3$, $Y(CH_3COCHCOCH_3)_3$, $Y_2(CO_3)_3$, $Y_2(C_2O_4)_3$, $Y(NO_3)_3$, $Y(ClO_4)_3$, $YPO_4$, $Y_2(SO_4)_3$, $YF_3$, $YCl_3$, $La(OOCH_3)_3$, $La(CH_3COCHCOCH_3)_3$, $La_2(CO_3)_3$, $La(NO_3)_3$, $La(ClO_4)_3$, $LaPO_4$, $La_2(SO_4)_3$, $LaF_3$, $LaCl_3$, $LaBr_3$, $LaI_3$ $Sm(OOCCH_3)_3$, $Sm(CH_3COCHCOCH_3)_3$, $Sm_2(CO_3)_3$, $Sm(NO_3)_3$, $Sm(ClO_4)_3$, $Sm_2(C_2O_4)_3$, $SmPO_4$, $Sm_2(SO_4)_3$, $SmF_3$, $SmCl_3$, $SmBr_3$, $SmI_3$, $Yb(OOCH_3)_3$, $Yb(NO_3)_3$, $Yb(ClO_4)_3$, $Yb_2(C_2O_4)_3$, $Yb_2(SO_4)_3$, $YbF_3$, $YbCl_3$, $Ti(OOCCH_3)_4$, $Ti(CO_3)_2$, $Ti(NO_3)_4$, $Ti(SO_4)_2$, $TiF_4$, $TiCl_4$, $TiBr_4$, $TiI_4$, $Zr(OOCCH_3)_4$, $Zr(CO_3)_2$, $Zr(NO_3)_4$, $Zr(SO_4)_2$, $ZrF_4$, $ZrCl_4$, $ZrBr_4$, $ZrI_4$, $ZrOCl_2$, $ZrO(NO_3)_2$, $ZrO(ClO_4)_2$, $ZrO(SO_4)$, $Hf(OOCCH_3)_4$, $Hf(CO_3)_2$, $Hf(NO_3)_4$, $Hf(SO_4)_2$, $HfOCl_2$, $HfF_4$, $HfCl_4$, $HfBr_4$, $HfI_4$, $V(CH_3COCHCOCH_3)_3$, $VOSO_4$, $VOCl_3$, $VCl_3$, $VCl_4$, $VBr_3$, $Nb(CH_3COCHCOCH_3)_5$, $Nb_2(CO_3)_5$, $Nb(NO_3)_5$, $Nb_2(SO_4)_5$, $NbF_5$, $NbCl_5$, $NbBr_5$, $NbI_5$, $Ta(OOCCH_3)_5$, $Ta_2(CO_3)_5$, $Ta(NO_3)_5$, $Ta_2(SO_4)_5$, $TaF_5$, $TaCl_5$, $TaBr_5$, $TaI_5$ $Cr(OOCCH_3)_2OH$, $Cr(CH_3COCHCOCH_3)_3$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$, $MoOCl_4$, $MoCl_3$, $MoCl_4$, $MoCl_5$, $MoF_6$, $MoI_2$, $WCl_4$, $WCl_6$, $WF_6$, $WBr_5$, $Mn(CH_3COCHCOCH_3)_2$, $MnCO_3$, $Mn(NO_3)_2$, $MnO$, $Mn(ClO_4)_2$, $MnF_2$, $MnCl_2$, $MnBr_2$, $MnI_2$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, $FeBr_3$, $FeI_3$, $FeC_6H_5O_7$, $Co(OOCCH_3)_2$, $Co(CH_3COCHCOCH_3)_3$, $CoCO_3$, $Co(NO_3)_2$, $CoC_2O_4$, $Co(ClO_4)_2$, $Co_3(PO_4)_2$, $CoSO_4$, $CoF_2$, $CoCl_2$, $CoBr_2$, $CoI_2$, $NiCO_3$, $Ni(NO_3)_2$, $NiC_2O_4$, $Ni(ClO_4)_2$, $NiSO_4$, $NiCl_2$, $NiBr_2$, $CuCl_2$, $CuBr_2$, $Cu(NO_3)_2$, $CuC_2O_4$, $Cu(ClO_4)_2$, $CuSO_4$, $Cu(OOCCH_3)_2$, $Zn(OOCCH_3)_2$, $Zn(CH_3COCHCOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $ZnBr_2$, $ZnI_2$, $AlF_3$, $AlCl_3$, $AlBr_3$, $AlI_3$, $Al_2(SO_4)_3$, $Al_2(C_2O_4)_3$, $Al(CH_3COCHCOCH_3)_3$, $Al(NO_3)_3$, $AlPO_4$, $GeCl_4$, $Sn(OOCCH_3)_4$, $Sn(SO_4)_2$, $SnF_4$, $SnCl_4$, and the like.

Examples of an organic cation include an ammonium compound such as tetraethylammonium, tetramethylammonium, benzyltrimethylammonium, trimethylammonium, triethylammonium, tripropylammonium, tributylammonium, dodecylammonium, N,N-dimethylanilinium, N,N-diethylanilinium, N,N-2,4,5-pentamethylanilinium, N,N-dimethyloctadecylammonium, octadecylammonium, N,N-dimethyl-p-n-butylanilinium, N,N-dimethyl-p- trimethylsilylanilinium, N,N-dimethyl-1-napthylanilinium, N,N-2-trimethylanilinium, 2,6-dimethylanilinium or the like, a nitrogen-containing aromatic compound such as pyridinium, N-methylpyridinium, quinolinium, N-methylpiperidinium, 2,6-dimethylpyridinium, 2,2,6,6-tetramethylpiperidinium or the like, an oxonium compound such as dimethyloxonium, diethyloxonium, diphenyloxonium, furanium, oxofuranium or the like, a phosphonium compound such as triphenylphosphonium, tetraphenylphosphonium, trimesitylphosphonium or the like, and a phosphorus-containing aromatic compound such as phosphabenzonium, phosphanaphthalenium or the like, but the organic cation is not limited thereto. In a preferred embodiment the ion-exchange layered silicate has been treated with one or more of tetraethylammonium, tetramethylammonium, benzyltrimethylammonium, trimethylammonium, triethylammonium, tripropylammonium, tributylammonium, dodecylammonium, N,N-dimethylanilinium, N,N-diethylanilinium, N,N-2,4,5-pentamethylanilinium, N,N-dimethyloctadecylammonium, octadecylammonium, N,N-dimethyl-p-n-butylanilinium, N,N-dimethyl-p-trimethylsilylanilinium, N,N-dimethyl-1-napthylanilinium, N,N-2-trimethylanilinium, 2,6-dimethylanilinium, pyridinium, quinolinium, N-methylpiperidinium, 2,6-dimethylpyridinium, 2,2,6,6-tetramethylpiperidinium, dimethyloxonium, diethyloxonium, diphenyloxonium, furanium, oxofuranium, tetraphenylphosphonium, phosphabenzonium, phosphanaphthalenium, hexafluorophosphate, tetrafluoroborate, and tetraphenylborate.

In addition to the above-illustrated anions, examples of other anions include an anion of a boron compound or a phosphorus compound such as hexafluorophosphate, tetrafluoroborate, tetraphenylborate or the like, but the anion is not limited thereto.

These salts may be used alone or in a mixture of two or more. Further, they may be used in combination with acids, alkalis, oxidizing agents, reducing agents, compounds intercalatable between layers of an ion-exchange layered silicate or the like. They may be combined with a treating agent to be added to the initiation or treatment, or they may be combined with a treating agent to be added during treatment.

(C) Alkalis

Examples of a treating agent used in alkali treatment include LiOH, NaOH, KOH, Mg(OH)$_2$, Ca(OH)$_2$, Sr(OH)$_2$, Ba(OH)$_2$ and the like. Since it is considered that the alkali treatment may damage the acidity of an ion-exchanged layered silicate, it is preferable to carry out acid treatment after achieving a structure change of a clay mineral by alkali treatment. However, even after the alkali treatment, if an acidity and an acid amount satisfy the above mentioned ranges, the effect of the present invention is not damaged. Examples of a preferable compound include LiOH, NaOH, KOH, Mg(OH)$_2$ or the like.

(D) Oxidizing Agents

Examples of an oxidizing agent include permanganates such as $HMnO_4$, $NaMnO_4$, $KMnO_4$ or the like, nitric acid compounds such as $HNO_3$, $N_2O_4$, $N_2O$, $Cu(NO_3)_2$, $Pb(NO_3)_2$, $AgNO_3$, $KNO_3$, $NH_4NO_3$ or the like, halogens such as $F_2$, $Cl_2$, $Br_2$, or $I_2$, peroxides such as $H_2O_2$, $Na_2O_2$, $BaO_2$, $(C_6H_5CO)_2O_2$, $K_2S_2O8$, $K_2SO_5$, $HCO_3H$, $CH_3CO_3H$, $C_6H_5CO_3H$, $C_6H_4(COOH)CO_3H$, $CF_3CO_3H$ or the like, oxyacids such as KIO, KClO, KBrO, $KClO_3$, $KBrO_3$, $KIO_3$, $HIO_4$, $KIO_4$ or the like, oxides such as $CeO_2$, $Ag_2O$, CuO, HgO, $PbO_2$, $Bi_2O_3$, $OSO_4$, $RuO_4$, $SeO_2$, $MnO_2$, $AS_2O_5$ or the like, oxygens such as oxygen, ozone or the like, hot concentrated sulfuric acid, a mixture of fuming sulfuric acid and concentrated nitric acid, nitrobenzene, iodoso compounds, and the like.

(E) Reducing Agents

Examples of a reducing agent include hydrogen and hydrogen compounds such as $H_2$, HI, $H_2S$, $LiAlH_4$, $NaBH_4$ or the like, sulfur compounds such as $SO_2$, $Na_2S$ or the like, alkali metals, alkaline earth metals, metals of Group 3 to Group 10 of the Periodic Table of the Elements or their alloys, metal salts of a low atomic valence state such as Fe(II), Sn(II), Ti(II), Cr(II) or the like, CO, and the like.

(F) Intercalation Compounds

Examples of a guest compound intercalated into layers of an ion-exchange layered silicate include a cationic inorganic compound such as $TiCl_4$, $ZrCl_4$ or the like, a metal alcoholate such as $Ti(OR)_4$, $Zr(OR)_4$, $PO(OR)_3$, $B(OR)_3$, (R is an alkyl group or an aryl group) or the like, a metal hydroxide or carboxylate ion such as $[Al_{13}O_4(OH)_{24}]_7^+$, $[Zr_4(OH)_{14}]_2^+$, $[Fe_3O(OCOCH_3)_6]^+$ or the like, an organic compound such as ethylene glycol, glycerol, urea, hydrazine or the like, and an organic cation such as an alkyl ammonium ion or the like.

When intercalating these compounds, a polymerized material obtained by hydrolyzing a metal alcoholate such as $Si(OR)_4$, $Al(OR)_3$, $Ge(OR)_4$, or the like, or a colloidal inorganic compound such as $SiO_2$ or the like may also be present. Examples of a pillar include an oxide or the like formed by intercalating the above hydroxide ion between layers and then dehydrating by heat. A guest compound may be used as it is or may be used after newly adsorbing water or after heat-dehydrating. Also, the guest compound may be used alone or in a mixture of two or more of the above solids.

The above-mentioned various treating agents may be used as a treating agent solution by dissolving in an appropriate solvent, or it is possible to use a treating agent itself as a solvent. Examples of a usable solvent include water, alcohols, aliphatic hydrocarbons, aromatic hydrocarbons, esters, ethers, ketones, aldehydes, furans, amines, dimethylsulfoxide, dimethylformamide, carbon disulfide, nitrobenzene, pyridines or their halides. A concentration of a treating agent in a treating agent solution is preferably from 0.1 to 100 wt. %, more preferably from 5 to 50 wt. %. If the treating agent concentration is within these ranges, a time required for treatment becomes shorter and an efficient production is possible.

Chemical Treatment Protocol

Acid Treatment

An acid treatment removes impurities on the surface or ion-exchanges a cation present between layers, and in addition to this function, the acid treatment elutes a part or whole of cations such as Al, Fe, Mg or the like in a crystal structure. Examples of an acid used in acid treatment include hydrochloric acid, nitric acid, sulfuric acid, phosphoric acid, acetic acid, and oxalic acid and the like. Particularly, it is preferable to use an inorganic acid. Usually the acid is used in a form of an acid aqueous solution. The acid used in the treatment may be a mixture of at least two kinds of acids. In a preferred embodiment, the acid used herein is sulfuric acid.

A particular preferable embodiment of the present invention is to carry out a treatment with an acid having a specific concentration. Any concentration of acid may be used, however higher acid concentrations (and higher temperatures) are more efficient. In particular using an acid concentration of more than 5 weight % (based upon the weight of the acid, any liquid diluent or solvent and the ion exchange layered silicate present), preferably more than 10 weight %, more preferably more than 15 weight % has been found to be effective. In a preferred embodiment the treatment is performed at temperatures of more than 50° C., preferably more than 70° C., more preferably at more than 90° C. The treatment preferably is allowed to react for 5 minutes to 10 hours, more preferably 30 minutes to 8 hours, more preferably 1 to 6 hours. In a particularly preferred embodiment, the treatment occurs at 90° C. or more for 2 to 6 hours using an acid concentration of more than 15 weight %. In another particularly preferred embodiment, the treatment occurs at 100° C. or more for 2 to 4 hours using an acid concentration of more than 15 weight %.

Generally, it is known that by subjecting the silicate to acid treatment, impurities on the surface are removed and cations such as Al, Fe, Mg or the like in a crystal structure are eluted, thereby increasing the surface area. Thus, in accordance with the progress of acid treatment, it is considered that the surface area and a pore volume are increased. However, in case of such concentrated acid treatment as carded out in the present invention, a surface area value of a silicate treated by the concentrated acid treatment employing such an acid concentration as defined as above is rather smaller than a surface area of a silicate treated by an acid treatment employing a lower acid concentration to have the same substituting components eluted. This fact means that a pore size of the silicate becomes larger. It is expected that this change achieves an effect of easily moving a material between an outer part and an inner part of a catalyst. Thus, a silicate treated by an acid having a high concentration provides a larger pore size, and it is expected that mass transport (of a metallocene complex, a monomer, an organoaluminum compound, a heterocyclic compound or the like) becomes easy in the inside of a catalyst or constituting particles in the same manner as in the outside. Accordingly, a catalyst prepared from the silicate of the present invention has active sites more uniformly dispersed, and it is considered that local heat generation on the catalyst is inhibited as compared with a conventional catalyst. Particularly, when producing an easily meltable or soluble polymer, e.g. in a case of low melting point random polymerization of a propylene type monomer, it is possible to carry out polymerization at a high activity and in a state of maintaining dispersed particles, which could not be conventionally achieved. After appropriate acid treatment the ion-exchange layered silicate will preferably have a surface area in the range of 100 to 450 m$^2$/g, preferably 150 to 400 m$^2$/g, more preferably 200-350 m$^2$/g.

An acid used for the concentrated acid treatment may be the same as those used in an ordinary acid treatment, but is preferably sulfuric acid, nitric acid or hydrochloric acid more preferably sulfuric acid.

Salt Treatment

Further, in the present invention, one may carry out a salt treatment. The salt treatment means a treatment carried out for the purpose of exchanging cations in an ion-exchange layered silicate. The treating conditions with a salt are not specially limited, but it is preferable to carry out the salt treatment under conditions of a salt concentration of from 0.1 to 50 wt. %, a treating temperature of from room temperature to a boiling point and a treating time of from 5 minutes to 24 hours in such a manner as to elute at least a part of materials constituting an ion-exchange layered silicate. Also, the salt may be used in an organic solvent such as toluene, n-heptane, ethanol or the like, or may be used in the absence of a solvent if it is liquid-like at the treating temperature, but it is preferably used as an aqueous solution. However, depending on a kind of a salt employed, the salt treatment achieves an effect similar to an acid treatment.

In the present invention, it is preferable to ion exchange at least 40%, preferably at least 60% of ion exchangeable cations of Group 1 metals contained in an ion-exchange layered silicate with cations dissociated from the salts as described above. After carrying out the above chemical treatment, it is preferable to remove ions eluted from the treatment and an excess amount of a treating agent. For this operation, water or an organic solvent is generally used. After dehydrating, drying is carried out generally at a drying temperature of from 100 to 800° C., preferably from 150 to 600° C.

Drying of Chemically Treated Ion-Exchange Layered Silicate

These ion-exchange layered silicates change their properties depending on a drying temperature employed even when their structures are not destroyed, and it is therefore preferable to change a drying temperature depending on their uses. The drying period is usually in a range of from 1 minute to 24 hours, preferably from 5 minutes to 6 hours, and a drying atmosphere is preferably dry air, dry nitrogen, dry argon, or carried out under reduced pressure. A drying method is not specially limited, but various methods may be employed.

In a preferred embodiment, ion-exchange layered silicates subjected to both acid and/or salt (or a combination thereof) chemical treatments described above, have one or more of the following features (as outlined in U.S. Pat. No. 6,531, 552 B2 and US 2003/0027950 A1 and hereby fully incorporated by reference):

(1) an amount of acid sites having a pKa of −8.2 or less of 0.05 mmol/g (where the amount is equivalent to the mmol/g of 2,6-dimethylpyridine consumed for neutralization), (2) performance that in desorption isotherm by nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≧0.8, (3) performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)-(c)>25 (cc/g), (4) a pore size distribution curve calculated from the desorption isotherm by nitrogen adsorption-desorption method, a pore diameter $D_m$ showing a maximum peak intensity $D_{VM}$ from 60 to 200 Å, (5) in a pore size distribution curve calculated from desorption isotherm by nitrogen adsorption-desorption method, a pore diameter $D_{m1/2}$(Å) on the smaller pore size side corresponding to a 1/2 peak intensity of the maximum peak intensity $D_{VM}$ has a relation of $D_{m1.2}/D_m$ of at least 0.65 and less than 1, provided that the largest value is employed when there are a plurality of $D_{m1/2}$ values, and or (6) an average crushing strength of at least 3 MPa as measured by a minute compression tester.

(1) Acid Strength/Acid Site Density

The term "acid" used herein is one category classifying a material, and is defined as a material of Bronsted acid or Lewis acid. Also, the term "acid site" is defined as a constituting unit of a material exhibiting a property as an acid, and for the present invention, its amount is analyzed by the method described in U.S. Pat. No. 6,531,552 B2 and is hereby full incorporated by reference. When a chemically treated ion-exchange layered silicate is used as the support or carrier, the amount of a specific acidity is measured with regard to a silicate obtained after the chemical treatment.

In one embodiment, the ion-exchange layered silicate is acidic in nature as determined by titration methods as outlined in U.S. Pat. No. 6,531,552 B2 which is hereby fully incorporated by reference.

In another embodiment, it is important to control an acidity and amount of acid sites, so as to afford an ion-exchange layered silicate that contains aluminum in an atomic ratio of Al/Si in a range of from 0.05 to 0.4, preferably from 0.05 to 0.25, more preferably from 0.07 to 0.23. The Al/Si atomic ratio is regarded as an index of acid treatment of the clay constituent. Furthermore, the chemically treated ion-exchange layered silicate having an acid site of at most −8.2 pKa, with the amount of acid site being equivalent to at least 0.05 mmol/g of 2,6-dimethylpyridine consumed for neutralization (as described in U.S. Pat. No. 6,531,552 B2). In general, the preferred amount of acid sites present in the ion-exchange layered silicate is 0.05 mmol/g or more and the amount of acid sites is preferably as high as possible.

(2) Performance in Nitrogen Adsorption/Desorption Isotherm

In the present invention, measurement of the adsorption and desorption isotherm by nitrogen adsorption-desorption method was carried out in accordance with generally used nitrogen adsorption-desorption method.

In general, the nitrogen adsorption-desorption isotherms for ion-exchange layered silicates exhibit an adsorption hysteresis. Detailed descriptions of adsorption-desorption fundamentals, including hysteresis, are discussed in "Adsorption Technology and Design" by Crittenden and Thomas and is incorporated by reference.

In one embodiment, the chemically treated ion-exchange layered silicate performance in the nitrogen adsorption-desorption isotherm exhibits a hysteresis.

In a preferred embodiment, the ion-exchange layered silicate exhibits the following performance in the nitrogen adsorption-desorption isotherm: that in desorption isotherm by nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≧0.8, (3) performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)-(c)>25 (cc/g), Examples of the analyzing apparatus include commercially available products such as Autosorb of Quantachrome Company or Omnisorp of Coulter Inc. or the like.

(3) Pore Size Distribution

The evaluation of the pore size distribution in the present invention employs the desorption isotherm. The desorption isotherm is a curve obtained while reducing the relative pressure. The desorption isotherm shows a lower relative pressure to the same desorbed gas amount as compared with adsorption isotherm, and consequently shows a lower free energy state, and is generally considered to be closer to a state of real thermodynamic stability.

In one embodiment, an ion-exchange layered silicate with any pore size and or any pore size distribution may be used.

In another embodiment, included in this invention is the preferred pore size distributions of the ion-exchange layered silicate as described in US 2003/0027950 A1 (which is fully incorporated here by reference) and listed above in "features" 4 and 5. Where $D_m$ (from differential values of pore volumes) represents a pore size diameter showing a maximum peak intensity and is generally expressed as "most frequently appearing pore diameter", $D_{VM}$ represents a maximum peak intensity and $D_{m1/2}$ represents a pore size diameter on the smaller diameter side corresponding to a point, the peak intensity of which is ½ of the maximum peak intensity. A pore diameter $D_{m1/2}$ is present at least one respectively on both sides of $D_m$, i.e. on the larger diameter side of $D_m$ and on the smaller diameter side of $D_m$, but a value on the smaller diameter side is taken as the $D_{m1/2}$ value in the present invention. Also, if there are a plurality of $D_{m1/2}$ values on the smaller diameter side, the largest value is employed for calculation. In one embodiment, the $D_{m1/2}D_m$ can range from 0.1 to 0.9. In another embodiment, a $D_{m1/2}D_m$ value is preferably at least 0.68, more preferably at least 0.70. Furthermore, a pore size distribution curve calculated from desorption isotherm by nitrogen adsorption-desorption method, a pore diameter $D_{m1/3}$(Å) on the smaller pore size side corresponding to a ⅓ peak intensity of the maximum peak intensity $D_{vm}$ has a relation of $D_{m1/3}/D_m$ of at least 0.55 and less than 1, provided that the largest value is employed when there are a plurality of $D_{m1/3}$ values. In an analogous manner as $D_{m1/2}$, a pore diameter $D_{m1/3}$ value is present respectively on both sides of $D_m$, i.e. at least one on the larger diameter side of $D_m$ and at least one on the smaller diameter side of $D_m$, but a value on the smaller diameter side is defined as $D_{m1/3}$. Also, when there are a plurality of $D_{m1/3}$ values on the smaller diameter side, the largest value is employed for calculation. A $D_{m1/3}/D_m$ value is preferably at least 0.56, more preferably at least 0.57. If the $D_{m1/3}/D_m$ value is less than 0.56, a considerable amount of smaller diameter pores are present, which is not preferred.

Moreover, the pore size distribution calculated for desorption isotherm by nitrogen adsorption-desorption method is a substantially unimodal peak. That is, there is not present a second peak, and if it is present, its intensity is at most 50%, preferably at most 40%, particularly at most 30% of a maximum peak intensity $D_{VM}$.

Also, the pore size distribution curve calculated from desorption isotherm by nitrogen adsorption-desorption method, wherein a peak intensity at a pore diameter of 50 Å is defined as $D_{V50A}$, $D_{V50A}/D_{VM}$ is at least 0.01 and at most 0.40, preferably at least 0.03 and at most 0.38, more preferably at least 0.05 and at most 0.36. If the $D_{V50A}/D_{VM}$ value exceeds 0.38, a considerable amount of smaller diameter pores are contained.

Thus, an ion-exchange layered silicate may have a predetermined pore size, but its pore size is sufficiently large to accept a metallocene complex, an organoaluminum compound, a heterocyclic compound and a monomer. Accordingly, these compounds participating in the reaction easily enter into pores in respective stages of formation of a catalyst, activation, prepolymetization and polymerizations and complexes are highly dispersed in carriers, and consequently metallocene catalyst active sites are uniformly formed. In a preferred embodiment the ion exchange layered silicate has a pore size that is sufficiently large enough that the catalyst compound, the organoaluminum and heterocyclic compounds may freely enter and diffuse evenly within the particle. Preferred pore sizes include 40 Angstroms to 500 Angstroms, preferably 50 Angatroms to 300 Angstroms, more preferably 70 to 200 Angstroms.

(4) Carrier Strength

In one embodiment, the ion exchange layered silicate have any a compression fracture strength (also called average crushing strength) as measured by a minute compression tester. Preferably the ion exchange layered silicate has a compression fracture strength of 3 to 20 MPa. Preferably, the average crushing strength is at least 5 MPa, more preferably at least 7 MPa. In addition, the upper limit of the ion exchange layered silicate strength is preferably an average crushing strength of at most 20 MPa, more preferably at most 18 MPa.

Organoaluminum Compound

In the present invention ion-exchange layered silicate is preferably contacted with an organoaluminum compound before treatment with a heterocyclic compound.

In one embodiment, preferred organoaluminum compounds described above are represented by the formula:

AlR$_3$    (Formula I)

wherein each R is independently a substituted or unsubstituted alkyl group and/or a substituted or unsubstituted aryl group. Preferably R is an alkyl group containing 1 to 30 carbon atoms. Preferred R groups include methyl, ethyl, propyl, butyl, pentyl, hexyl, heptyl, octyl, nonyl, decyl, undecyl, docecyl, aryl, and all isomers thereof.

In another embodiment, the preferred organoaluminum compounds include alkylaluminum compounds and/or alumoxanes, preferably methylalumoxane, modified methylalumaxane, or ethylalumoxane. The organoaluminum compounds include alkylaluminum compounds where the alkyl is a C1 to C40 linear, branched or cyclic alkyl, preferably a C1 to C12 linear or branched alkyl, preferably methyl, ethyl, propyl, butyl, isobutyl, n-butyl, isopentyl, pentyl, hexyl, octyl, nonyl, decyl or dodecyl, even more preferably methyl, ethyl, propyl, butyl, isobutyl, n-butyl, or hexyl. Preferred organoaluminum compounds include those represented by the formula:

AlR$_n$Y$_{3-n}$    (Formula II)

where R is a hydrocarbon group having a carbon number of from 1 to 30, preferably 4 to 12, Y is hydrogen, halogen, an alkoxy group or a siloxy group, and n is 1, 2, or 3. Particularly preferred alkyl aluminum compounds useful in this invention include: trimethylaluminum, triethylaluminum, triisobutylaluminum, tri-n-hexylaluminum, tri-n-octylaluminum, tri-iso-octylaluminum, triphenylaluminum and combinations thereof.

In another embodiment, the organoaluminum compounds also include combinations of organoaluminum compounds. For example, it is possible to use a mixture of organoaluminum compounds.

In another embodiment, the organoaluminum compound comprises one or more alumoxanes which are generally oligomeric compounds containing —Al(R)—O— or —Al(R)$_2$—O— subunits, where R is an alkyl group, preferably a C1 to C40 linear, branched or cyclic alkyl, preferably a C1 to C12 linear or branched alkyl, preferably methyl, ethyl, propyl, butyl, isobutyl, n-butyl, isopentyl, pentyl, hexyl, octyl, nonyl, decyl or dodecyl, even more preferably methyl, ethyl, propyl, butyl, isobutyl, n-butyl, or hexyl. Examples of alumoxanes include methylalumoxane (MAO), modified methylalumoxane (MMAO), ethylalumoxane, isobutylalumoxane, tetraethyldialumoxane and di-isobutylalumoxane.

Alumoxanes may be produced by the hydrolysis of the respective trialkylaluminum compound. MMAO may be produced by the hydrolysis of trimethylaluminum and a higher trialkylaluminum such as triisobutylaluminum. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publication EP-A-0 561 476, EP-B1-0 279 586, EP-A-0 594 218 and EP-B1-0 586 665, and PCT publications WO 94/10180 and WO 99/15534, all of which are fully incorporated herein by reference.

Contact between an ion-exchange layered silicate and an organoaluminum compound can be carried out under an inert gas atmosphere such as nitrogen in a solvent of an inert hydrocarbon such as hexane, heptane, pentane, cyclohexane, benzene, toluene, xylene or the like, and the solvent may be used alone or in a mixture of two or more.

An amount of an organoaluminum compound used is preferably from 0.01 to 1000 mmol, more preferably from 0.1 to 100 mmol, per 1 g of an ion-exchange layered silicate.

A concentration of an ion-exchange layered silicate in a solvent is preferably from 0.001 to 100 g/mL, more preferably form 0.01 to 10 g/mL, and a concentration of an organoaluminum compound is preferably from 0.001 to 100 mmol/mL, more preferably from 0.01 to 10 mmol.

Contacting may be carried out by dispersing an ion-exchange layered silicate in a solvent and then bringing an organoaluminum compound in contact therewith. Alternatively, contacting may be carried out by adding an organoaluminum compound to a solvent and then dispersing an ion-exchange layered silicate therein.

The contacting treatment is carried out generally at a temperature of from −50° C. to a boiling point of a solvent, preferably from 0° C. to a boiling point of a solvent. The contacting time is from 1 minute to 48 hours, preferably from 1 minute to 24 hours.

The order of contacting an organoaluminum compound with an ion-exchange layered silicate is not specially limited as far as the object of the present invention is achieved, but it is more effective to carry out the contacting treatment after chemical treatment of the silicate or preferably after drying carried out after the chemical treatment.

Also, the order of contacting treatment step of an organoaluminum compound and an ion-exchange layered silicate and the granulation step of an ion-exchange layered silicate is not specially limited as far as the object of the present invention is achieved, but it is preferable to carry out the treatment with an organoaluminum compound after granulating the silicate.

Further, it is possible to enhance the effect of the present invention by combining the above-mentioned respective treatments. Thus, after controlling a particle size distribution and a carrier particle strength by granulating an ion-exchange layered silicate, a carrier obtained through the following Step 1 and Step 2 is used as a catalyst component for olefin polymerization.

Step 1: after granulating an ion-exchange layered silicate, the silicate is treated with an acid having an acid concentration as described above.

Step 2: after carrying out step 1, the silicate is treated with an organoaluminum compound which is any organoaluminum compound from the discussion above.

Heterocyclic Compound

In a preferred embodiment, the heterocyclic compound comprises one or more heteroatoms selected from Group 15 and 16, preferably the heteroatom(s) is nitrogen, oxygen and/or sulfur, most preferably nitrogen. The heterocyclic compounds may be unsubstituted, or one or more positions may be substituted. In a preferred embodiment, one or more positions on the heterocyclic compound are substituted with a halogen atom or a halogen containing group, where the halogen is chlorine, bromine or fluorine, preferably bromine or fluorine, most preferably fluorine. Preferably, the heterocyclic compound includes 4 or more ring members and more preferably 5 or more ring members.

The heterocyclic compound may be unsubstituted or substituted with one or a combination of substituent groups. Examples of suitable substituents include hydrogen, halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, aroylamino radicals, straight, branched or cyclic, alkylene radicals, or any combination thereof. The substituents groups may also be substituted with halogens, particularly fluorine or bromine, or heteroatoms or the like.

Examples of substituents include, but are not limited to, methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobezyl.

In one embodiment, the heterocyclic compound is unsubstituted. In another embodiment one or more positions on the heterocyclic compound is substituted with a halogen atom or a halogen atom containing group, for example a halogenated aryl group. Preferably the halogen is chlorine, bromine or fluorine, more preferably fluorine or bromine and even more preferably the halogen is fluorine.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5-dimethyl pyrroles, 3-pentafluorophenyl pyrrole, 4,5,6,7-tetrafluoroindole or 3,4-difluoropyrroles.

In a preferred embodiment, the heterocyclic compound is an indole represented by Formula III:

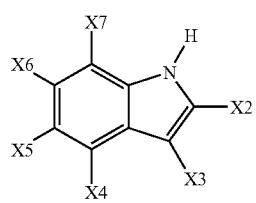

(Formula III)

where each of X2 X3, X4, X5, X6 and X7 is, independently, selected from hydrogen, halogen, preferably chlorine, bromine or fluorine, more preferably bromine or fluorine and most preferably fluorine, and alkyl group, an aryl group, an alkoxide group, an aryloxide group or an alkyl substituted aryl group wherein the groups may be halogenated or partially halogenated, preferably containing a fluorine atom and/or a bromine atom. In one embodiment, the indole is not perhalogenated. Preferably, each of X2 X3, X4, X5, X6 and X7 is, independently, hydrogen, halogen an alkyl group, a halogenated or partially halogenated alkyl group, an aryl group, a halogenated or partially halogenated aryl group, an aryl substituted alkyl group or a halogenated or partially halogenated aryl substituted alkyl group. Preferably the halogen is chlorine, bromine, or fluorine, and most preferably fluorine. In another embodiment, each of X2 X3, X4, X5, X6 and X7 is, independently, hydrogen or halogen, preferably bromine or fluorine, more preferably fluorine. In another embodiment each of X2 X3, X4, X5, X6 and X7 is, independently, an alkyl group, a halogenated or partially halogenated alkyl group, an aryl group, or a halogenated or partially halogenated aryl group.

In one embodiment, the heterocyclic compounds and the aluminum alkyl and/or the alumoxanes described above are combined first and then added to an ion-exchange layered silicate. In another embodiment the heterocyclic compound is combined with an ion-exchange layered silicate, that has been treated with the alkylaluminum or the alumoxane compound, such that the silicate has aluminum alkyl groups bonded thereto. In another embodiment, combinations of two or more of the supported activators of the invention may be used alone or with other activators or methods of activation. For example, the supported activators of the invention may be used in combination with other activators including aluminoxane, modified aluminoxane, tri (n-butyl) ammonium tetrakis (pentafluorophenyl) boron, a trisperfluorophenyl boron metalloid precursor or a trisperfluoronapthyl boron metalloid precursor, polyhalogenated heteroborane anions, trimethylaluminum, triethylaluminum, triisobutylaluminum, tri-n-hexylaluminum, tri-n-octylaluminum, tris (2,2',2''-nona-fluorobiphenyl) fluoroaluminate, perchlorates, periodates, iodates and hydrates, (2,2'-bisphenyl-ditrimethylsilicate). 4THF and organo-boron-aluminum compound, silylium salts and dioctadecylmethylammonium-bis(tris (pentafluorophenyl)borane)-benzimidazolide or combinations thereof.

Olefin Polymerization Catalyst System

In the present invention, an olefin polymerization catalyst system can be prepared by contacting the supported activators described herein with a catalyst compound (also called catalyst precursor compounds, pre-catalyst compounds or catalyst precursors). In one embodiment, a supported catalyst system may be prepared, generally, by the reaction of the heterocyclic compound with an aluminum alkyl or alumoxane, the addition of a catalyst precursor, followed by addition of an ion-exchange layered silicate. Alternately a supported catalyst system may be prepared, generally, by the reaction of the heterocyclic compound with an aluminum alkyl or alumoxane, an ion-exchange layered silicate, and then adding one or more catalyst precursors.

In a preferred embodiment the ion exchange layered silicate is combined with the alky aluminum, thereafter is combined with the heterocyclic compound, and thereafter is combined with the catalyst precursor(s).

Catalyst Compounds

The supported activators of the invention may be utilized in conjunction with any suitable polymerization catalyst compound or compounds to polymerize unsaturated monomers, including olefin(s). Examples of suitable catalyst compounds include bulky ligand metallocene catalyst compositions, Group 15 atom containing metal polymerization catalyst compositions, and phenoxide transition metal catalyst compositions. The following is a non-limiting discussion of the various polymerization catalyst compounds which may be utilized with the supported activators of the invention.

Bulky Ligand Metallocene Catalyst Compositions

The supported activatores of the present invention may be used to activate bulky ligand metallocene catalyst compositions. Generally, these catalyst compounds include half and full sandwich compounds having one or more bulky ligands bonded to at least one metal atom. Typical bulky ligand metallocene compounds are described as containing one or more bulky ligand(s) and one or more leaving group(s) bonded to at least one metal atom.

The bulky ligands may be open, acyclic, fused ring(s) or ring system(s), or a combination thereof. The ring(s) or ring system(s) of these bulky ligands are typically composed of atoms selected from Groups 13 to 16 atoms of the Periodic Table of the Elements. Preferably the atoms are selected from the group consisting of carbon, nitrogen, oxygen, silicon, sulfur, phosphorus, germanium, boron and aluminum or a combination thereof. Most preferably the ring(s) or ring system(s) are composed of carbon atoms such as but not limited to those cyclopentadienyl ligands or cyclopentadienyl-type ligand structures. The bulky ligands may also be other similar functioning ligand structure such as pentadiene, a cyclooctatetradienyl or an imide ligand. The metal atom is preferably selected from Group 3 through 15 and the lanthanide or actinide series of the Periodic Table of the Elements. Preferably the metal is a transition metal from Groups 4 through 12, more preferably Groups 4, 5 and 6, and most preferably the transition metal is from Group 4, especially Ti or Zr or Hf.

In one embodiment, the bulky ligand metallocene catalyst compounds, which may be utilized with the supported activator of the invention, may be represented by Formula IV:

  (Formula IV)

$$L^A L^B M Q_n$$

where M is a metal atom from the Periodic Table of the Elements and may be a Group 3 to 12 metal or from the lanthanide or actinide series of the Periodic Table of the Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine (WO 99/40125), pyrrolyl ligands, pyrazolyl ligands, carbazolyl ligands, borabenzene ligands and the like, including hydrogenated versions thereof, for example tetrahydroindenyl ligands. In another embodiment, $L^A$ and $L^B$ may comprise one or more heteroatoms, for example, nitrogen, silicon, boron, germanium, sulfur and phosphorus, in combination with carbon atoms to form an open, acyclic, or preferably a fused, ring or ring system, for example, a heterocyclopentadienyl ancillary ligand. Other $L^A$ and $L^B$ bulky ligands include but are not porphyrins, phthalocyanines, corrins and other polyazamacrocycles. Independently, each $L^A$ and $L^B$ may be the same or different type of bulky ligand that is bonded to M. In one embodiment of Formula (IV) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorus, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In on embodiment, Q is a monoanionic labile ligand having a sigma-bond to M. Depending on the oxidation state of the metal, the value for n is 0, 1, or 2 or such that Formula (IV) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the supported activator of the invention is utilized with the bulky ligand metallocene catalyst compounds of Formula (V) where $L^A$ and $L^B$ are bridged to each other by at least one bridging group, A, as represented in Formula V:

$$L^A A L^B M Q_n \quad \text{(Formula V)}$$

These bridged compounds are known as bridged, bulky ligand metallocene catalyst compounds. $L^A$, $L^B$, M, Q and n are defined above. Non-limiting examples of bridging group A include bridging groups containing at least one Group 13 to 16 atom, often referred to as divalent moiety such as but not limited to as least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group may also contain substituent groups R as defined above including halogens and iron. Non-limiting examples of bridging group A may be represented by $R'_2C$, $R'_2Si$, $R'_2SiR'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula (V) have two or more bridging groups A (EP 664 301 B1).

In another embodiment, the supported activator of the invention may be utilized with bulky ligand metallocene catalyst compounds where the R substituents on the bulky ligands $L^A$ and $L^B$ of Formulas (IV) and (V) are substituted with the same or different number of substituents on each of the bulky ligands. In another embodiment, the bulky ligands $L^A$ and $L^B$ of formulas (IV) and (V) are different from each other.

In another embodiment, the supported activator of the invention may be utilized with other bulky ligand metallocene catalyst compounds such as those described in U.S. Pat. Nos. 5,064,802, 5,145,819, 5,243,001, 5,239,022, 5,276,208, 5,296,434, 5,321,106, 5,329,031, 5,304,614, 5,677,401, 5,723,398, 5,753,578, 5,854,363, 5,856,547, 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are fully incorporated herein by reference.

In another embodiment, the supported activator of the invention may be utilized with bulky ligand metallocene catalysts which include bridged heteroatom, mono-bulky ligand metallocene compounds. These types of catalysts and catalyst systems are described in, for example, PCT publication WO 92/00333, WO 94/07928, WO 91/04257, WO 94/03506, WO 96/00244, WO 97/15602 and WO 99/20637 and U.S. Pat. Nos. 5,057,475, 5,096,867, 5,055,438, 5,198, 401, 5,227,440, and 5,264,405 and European publication EP-A-0 420 436, all of which are herein fully incorporated by reference.

In this embodiment, the supported activatores of the invention are utilized with a bulky ligand metallocene catalyst compound represented by Formula VI:

$$L^C A J M Q_n \quad \text{(Formula VI)}$$

where M is a Group 3 to 12 metal atom or a metal selected from the Group of actinides and lanthanides of the Periodic Table of the Elements, preferably M is a Group 4 to 12 transition metal, and more preferably M is a Group 4, 5 or 6 transition metal, and most preferably M is Group 4 transition metal in any oxidation state, especially Ti or Zr or Hf, $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In Formula (VI) above, $L^C$, A and J form a fused ring system. In an embodiment, $L^C$ of formula (VI) is as defined above for $L^A$, A, M and Q of formula (VI) are as defined above in formula (V).

In Formula (VI) J is a heteroatom containing ligand in which J is an element with a coordination number of three from Group 15 or an element with a coordination number of two from Group 16 of the periodic Table of the Elements. Preferably J contains a nitrogen, phosphorus, oxygen or sulfur atom with nitrogen being most preferred.

In another embodiment, the supported activator of the invention is utilized with a bulky ligand metallocene catalyst compound which is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment the supported activator of the invention is utilized with a ligand metallocene catalyst compound, which may be represented by Formula (VII):

$$L^D M Q_2 (YZ) X_x \quad \text{(Formula VII)}$$

Where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a uncharged polydentate ligand; Q is a univalent anionic ligand also bonded to M; X is a univalent anionic group when n is 2 or X is a divalent anionic group when n is 1; n is 1 or 2.

In Formula (VII), $L^D$ is defined to be the same as $L^A$ above and M are as defined above for Formula (IV). Q is as defined above for Formula (IV), preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$ and —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the supported activator of the invention is utilized with a bulky ligand metallocene catalyst compounds, which include heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorus and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the supported activator of the invention may be utilized with a bulky ligand metallocene catalyst compounds, which include complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the supported activator of the invention may be utilized with a bulky ligand metallocene catalyst compounds which may be represented by Formula (VIII):

$$((Z)XA_t(YJ))_qMQ_n \qquad \text{Formula (VIII)}$$

where M is selected from Group 3 to 13 or lanthanide and actinide series of the Periodic Table of the Elements; Q is bonded to M and each Q is monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y of J, preferably X and J; q is 1 or 2; n is 1, 2 3, or 4 depending on the oxidation state of M. In one embodiment, where X is oxygen or sulfur then Z is optional. In another embodiment, where X is nitrogen or phosphorus then Z is present. In an embodiment, Z is preferably an aryl group, more preferably a substituted aryl group.

It is also within the scope of this invention, in one embodiment, that the bulky ligand metallocene catalyst compounds, which may be utilized with the supported activator of the invention include complexes of Ni$^{2+}$ and Pd$^{2+}$ described in the articles Johnson, et al., New Pd(II)- and Ni(II)-Based Catalysts for Polymerization of Ethylene and a-Olefins", J. Am. Chem. Soc. 1995, 117, 6414-6415 and Johnson, et al., "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, WO 99/02472, U.S. Pat. Nos. 5,852,145, 5,866,663, and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene catalyst are those diimine based ligands of Group 8 to 10 metal compounds disclosed in PCT publications WO 96/23010 and WO 97/48735 and Gibson, et al., Chem. Comm., pp. 849-850 (1998), all of which are herein incorporated by reference.

Other bulky ligand metallocene catalysts, which may be utilized with the supported activator of the invention, are those Group 5 and 6 metal imido complexes described in EP-A2-0 816 384 and U.S. Pat. No. 5,851,945, which is incorporated herein by reference. In addition, bridged bis (amido) catalyst compounds are described in WO 96/27439, which is herein incorporated by reference. Other bulky ligand metallocene catalysts are described as bis(hydroxy aromatic nitrogen ligands) in U.S. Pat. No. 5,852,146 which is incorporated herein by reference. Other metallocene catalysts containing one or more Group 15 atoms include those described in WO 98/46651, which is herein incorporated herein by reference. Still another metallocene bulky ligand metallocene catalysts include those multinuclear bulky ligand metallocene catalysts as described in WO 99/20665, which is incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Group 15 Atom Containing Polymerization Catalysts

The supported activator of the invention may also be utilized with Group 15 atom containing polymerization catalyst compounds. Generally, these catalysts includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 and 16 atom through another group.

Preferably, at least one of the Group 15 atoms is also bound to a Group 15 or 16 atom through another group which may be a C1 to C20 hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

Group 15 atom containing metal polymerization catalyst compounds may be represented by Formula (IX) or (X):

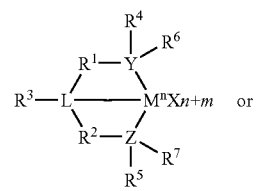

Formula (IX)

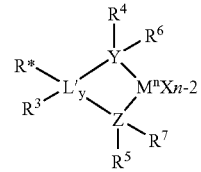

Formula (X)

wherein M is a transition metal, preferably a Group 3 to 14 main group metal, preferably a Group 4, 5, or 6 metal, and more preferably a Group 4 metal, and most preferably zirconium, titanium or hafnium, Each X is independently a leaving group, preferably an anionic leaving group, and more preferably hydrogen, a hydrocarbyl group, a heteroatom, or a halogen, and most preferably an alkyl or an aryl substituted alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group.

$R^3$ is absent, a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen.

$R^4$ and $R^5$ are independently an alkyl group, an aryl group, substituted aryl group, a cyclic alkyl group, a substituted cyclic alkyl group, a cyclic aralkyl group, a substituted cyclic aralkyl group or a multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, heteroatom containing group.

By "formal charge of the YZL or YZL' ligand", it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

Phenoxide Transition Metal Catalyst Compositions

The supported activator of the invention may also be used with phenoxide transition metal catalyst compounds. Generally, these complexes are heteroatom substituted phenoxide ligated Group 3 to 10 transition metal or lanthanide metal compounds wherein the metal is bound to the oxygen of the phenoxide group.

Phenoxide transition metal catalyst compounds may be represented by Formula XI or XII:

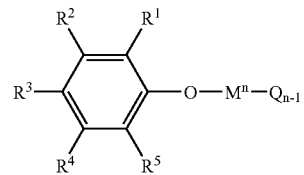

Formula (XI)

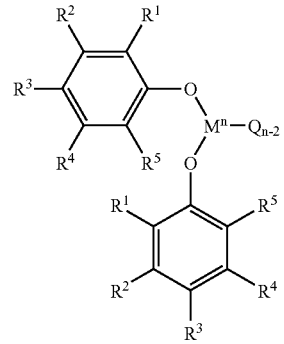

Formula (XII)

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M;

At least one of $R^2$ to $R^5$ is a heteroatom containing group, the rest of $R^2$ to $R^5$ are independently hydrogen or a $C_1$ to $C_{100}$ group, preferably a $C_4$ to $C_{20}$ alkyl group, preferred examples of which include butyl, isobutyl, t-butyl, pentyl, hexyl, heptyl, isohexyl, octyl, isooctyl, decyl, nonyl, dodecyl, and any of $R^2$ to $R^5$ also may or may not be bound to M;

Each $R^1$ to $R^5$ group may be independently substituted or unsubstituted with other atoms, including heteroatoms or heteroatom containing group(s):

O is oxygen;

M is a Group 3 to Group 10 transition metal or lanthanide metal, preferably a Group 4 metal, preferably M is Ti, Zr or Hf;

n is the valence state of the metal M, preferably 2, 3, 4, or 5; and

Q is, and each Q may be independently be, an alkyl, halogen, benzyl, amid, carboxylate, carbamate, thiolate, hydride or alkoxide group, or a bond to an R group containing a heteroatom which may be any or $R^1$ to $R^5$.

A heteroatom-containing group may be any heteroatom or a heteroatom bound to carbon, silicon or another heteroatom. Preferred heteroatoms include boron, aluminum, silicon, nitrogen, phosphorus, arsenic, tin, lead, antimony, oxygen, selenium, and tellurium. Particularly preferred heteroatoms include nitrogen, oxygen, phosphorus, and sulfur. Even more particularly preferred heteroatoms include nitrogen and oxygen. The heteroatom itself may be directly bound to the phenoxide ring or it may be bound to another atom or atoms that are bound to the phenoxide ring. The heteroatom-containing group may contain one or more of the same or different heteroatoms. Preferred heteroatom containing groups include imines, amines, oxides, phosphines, ethers, ketones, heterocyclics, oxazolines, thioethers, and the like. Particularly preferred heteroatom containing groups include imines. Any two adjacent R groups may form multi-ring structures. In one embodiment any two or more R groups do not form a 5 membered ring.

In a preferred embodiment the heteroatom substituted phenoxide transition metal compound is an iminophenoxide Group 4 transition metal compound, and more preferably and iminophenoxidezirconium compound.

Other Bulky Ligand Metallocene Catalyst Compounds

Other catalysts that may be used with the supported activators of this invention are those Group 5 and 6 metal imido complexes described in EP-A2-0 816 384 and U.S. Pat. No. 5,851,945 which is incorporated herein by reference. In addition, other catalysts that may be used with the supported activators of this invention include bridged bis (arylamido) Group 4 compounds described by D. H. McConville, et al., in Organometallics 1995, 14, 5478-5480, which is herein incorporated by reference. Bridged bis(amido) catalyst compounds are described in WO 96/27439, which is herein incorporated by reference may also be activated by the compositions of the present invention. Other suitable catalysts that may be used with the supported activators of this invention are described as bis(hydroxy aromatic nitrogen ligands) in U.S. Pat. No. 5,852,146, which is incorporated herein by reference. Other catalysts containing on or more Group 15 atoms that may be used with the supported activators of this invention include those described in WO 98/26651, which is incorporated herein by reference. Still other catalysts that may be used with the supported activators of this invention include those multinuclear bulky ligand metallocene catalysts as described in WO 99/20665, which is incorporated herein by reference.

It is also contemplated that in one embodiment, the supported activator of the inventions are utilized with bulky ligand metallocene catalysts including their structural or optical or enantiomeric isomers (meso and racemic isomers, for example see U.S. Pat. No. 5,852,143, incorporated herein by reference) and mixtures thereof.

In another embodiment, it is further contemplated that the polymerization catalysts, described above may be used in combination with the activator(s) and activator system of the present invention.

Non-limiting examples of metallocene-type transition metal compounds corresponding to formulas (IV) and (V) include:

rac-dimethylsilyl-bis(indenyl)hafniumdimethyl,
rac-dimethylsilyl-bis(indenyl)hafniumdichloride,
rac-dimethylsilyl-bis(indenyl)zirconiumdimethyl,
rac-dimethylsilyl-bis(indenyl)zirconiumdichloride,
rac-dimethylsilyl-bis(2-methyl-4-phenyl-indenyl)hafniumdimethyl,
rac-dimethylsilyl-bis(2-methyl-4-phenyl-indenyl) hafniumdichloride,
rac-dimethylsilyl-bis(2-methyl-4-phenyl-indenyl) zirconiumdimethyl,
rac-dimethylsilyl-bis(2-methyl-4-phenyl-indenyl) zirconiumdichloride,
rac-dimethylsilyl-bis(2-methyl-benzindenyl)hafniumdimethyl,
rac-dimethylsilyl-bis(2-methyl-benzindenyl) hafniumdichloride,
rac-dimethylsilyl-bis(2-methyl-benzindenyl) zirconiumdimethyl,
rac-dimethylsilyl-bis(2-methyl-benzindenyl) zirconiumdichloride,
rac-dimethylsilyl-bis-(2-methyl-indenyl) zirconiumdimethyl,
rac-dimethylsilyl-bis-(2-methyl-indenyl) hafniumdimethyl,
rac-dimethylsilyl-bis-(2-methyl-indenyl) hafniumdichloride,
rac-dimethylsilyl-bis-(2-methyl-indenyl) zirconiumdichloride,
rac-dimethylsilyl-bis(2-methyl-4-naphthyl-indenyl)hafniumdimethyl,
rac-dimethylsilyl-bis(2-methyl-4-naphthyl-indenyl) zirconiumdichloride,
rac-dimethylsilyl-bis(2-methyl-4-naphthyl-indenyl) hafniumdichloride,
rac-dimethylsilyl-bis(2-methyl-4-naphthyl-indenyl) zirconiumdimethyl,
rac-ethylene-bis(indenyl)hafniumdimethyl,
rac-ethylene-bis(indenyl)hafniumdichloride,
rac-ethylene-bis(indenyl)zirconiumdimethyl,
rac-ethylene-bis(indenyl)zirconiumdichloride,
rac-dimethylsilyl-bis(2-methyl-4-(2'-methyl-phenyl)-indenyl)hafniumdimethyl,
rac-dimethylsilyl-bis(2-methyl-4-(2'-methyl-phenyl)-indenyl)hafniumdichloride,
rac-dimethylsilyl-bis(2-methyl-4-(2'-methyl-phenyl)-indenyl)zirconiumdimethyl,
rac-dimethylsilyl-bis(2-methyl-4-(2'-methyl-phenyl)-indenyl) zirconiumdichloride,
rac-dimethylsilyl-bis(2-methyl-4-(4'-methyl-phenyl)-indenyl)hafniumdimethyl,
rac-dimethylsilyl-bis(2-methyl-4-(4'-methyl-phenyl)-indenyl)hafniumdichloride,
rac-dimethylsilyl-bis(2-methyl-4-(4'-methyl-phenyl)-indenyl)zirconiumdimethyl,
rac-dimethylsilyl-bis(2-methyl-4-(4'-methyl-phenyl)-indenyl) zirconiumdichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl-phenyl)-indenyl)hafniumdichloride,
rac-dimethylsilyl-bis(2-methyl-4-(4'-tert-butyl-phenyl)-indenyl)zirconiumdimethyl,
rac-dimethylsilyl-bis(2-methyl-4-(4'-tert-butyl-phenyl)-indenyl)zirconiumdichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl-phenyl)-indenyl)hafniumdichloride,
rac-dimethylsilyl-bis(2-methyl-4-(4'-tert-butyl-phenyl)-indenyl)zirconiumdimethyl,
rac-dimethylsilyl-bis(2-methyl-4-(4'-tert-butyl-phenyl)-indenyl) zirconiumdichloride,
rac-dimethylsilyl-bis(2-methyl-4-(4'-tert-butyl-phenyl)-indenyl)(2-isoprpyl-4-(4'-tert-butyl-phenyl)-indenyl)hafniumdimethyl,
rac-dimethylsilyl-(2-methyl-4-(4'-tert-butyl-phenyl)-indenyl)(2-isoprpyl-4-(4'-tert-butyl-phenyl-indenyl)hafniumdichloride,
rac-dimethylsilyl-(2-methyl-4-(4'-tert-butyl-phenyl)-indenyl)(2-isoprpyl-4-(4'-tert-butyl-phenyl-indenyl)zirconiumdichloride,
rac-dimethylsilyl-(2-methyl-4-(4'-tert-butyl-phenyl)-indenyl)(2-isoprpyl-4-(4'-tert-butyl-phenyl-indenyl)zirconiumdimethyl,
rac-dimethylsilyl-bis(2-methyl-4,6-diisopropyl-indenyl) hafniumdimethyl,
rac-dimethylsilyl-bis(2-methyl-4,6-diisopropyl-indenyl)zirconiumdimethyl,
rac-dimethylsilyl-bis(2-methyl-4,6-diisopropyl-indenyl)zirconiumdichloride, rac-dimethylsilyl-bis(2-methyl-4,6-diisopropyl-indenyl)hafniumdichloride,
Bis(cyclopentadieneyl)zirconiumdichloride,
Bis(cyclopentadienyl)zirconiumdimethyl,
Bis(pentamethylcyclopentadieneyl)zirconiumdichloride,
Bis(pentamethylcyclopentadienyl)zirconiumdimethyl,
Bis(cyclopentadieneyl)(pentamethylcyclopentadienyl)zirconiumdichloride,
Bis(cyclopentadienyl)(pentamethylcyclopentadienyl)zirconiumdimethyl,
Bis(1-methyl,4-butylcyclopentadienyl)zirconiumdichloride,
Bis(1-methyl,4-butylcyclopentadienyl)zirconiumdimethyl,
Bis(1-methyl,4-butylcyclopentadienyl)zirconiumdimethoxide,
Bis(1-methyl,4-butylcyclopentadienyl)zirconiumdibenzyl,
Bis(1-methyl,4-butylcyclopentadienyl)zirconiumdifluoride,
Bis(1-methyl,4-butylcyclopentadienyl)zirconiumdiamide,
Bis(1-methyl,4-ethylcyclopentadienyl)zirconiumdichloride,
Bis(1-methyl,4-ethylcyclopentadienyl)zirconiumdimethyl,
Bis(1-methyl,4-benzylcyclopentadienyl)zirconiumdichloride,
Bis(1-methyl,4-benzylcyclopentadienyl)zirconiumdimethyl,
Bis(1-methyl,3-butylcyclopentadienyl)zirconiumdichloride,
Bis(1-methyl,3-butylcyclopentadienyl)zirconiumdimethyl,
Bis(1-methyl,3-n-propylcyclopentadienyl)zirconiumdichloride,
Bis(1-methyl,3-n-propylcyclopentadienyl)zirconiumdimethyl,
Bis(1-methyl,3-iso-propylcyclopentadienyl)zirconiumdichloride,
Bis(1-methyl,3-iso-propylcyclopentadienyl)zirconiumdimethyl,
Bis(1,3-dimethylcyclopentadienyl)zirconiumdichloride,
Bis(1,3-dimethylcyclopentadienyl)zirconiumdimethyl,
Bis(n-propylcyclopentadienyl)zirconiumdichloride,
Bis(n-propylcyclopentadienyl)zirconiumdimethyl,
Bis(n-propylcyclopentadienyl)zirconiumdifluoride,
Bis(n-propylcyclopentadienyl)zirconiumdiamide,
Bis(n-propylcyclopentadienyl)zirconiumdibenzyl,
Bis(n-propylcyclopentadienyl)zirconiumdimethoxide,
Bis(n-propylcyclopentadienyl)hafniumdichloride,
Bis(n-propylcyclopentadienyl)hafniumdimethyl,
Bis(n-propylcyclopentadienyl)hafniumdifluoride,
Bis(n-propylcyclopentadienyl)hafniumdiamide,
Bis(n-propylcyclopentadienyl)hafniumdibenzyl,
Bis(n-propylcyclopentadienyl)hafniumdimethoxide,
Bis(n-butylcyclopentadienyl)zirconiumdichloride,
Bis(n-butylcyclopentadienyl)zirconiumdimethyl,
Bis(tert-butylcyclopentadienyl)zirconiumdichloride,
Bis(tert-butylcyclopentadienyl)zirconiumdimethyl,
Bis(benzylcyclopentadienyl)zirconiumdichloride,
Bis(benzylcyclopentadienyl)zirconiumdimethyl,
Bis(benzylcyclopentadienyl)(pentamethylcyclopentadienyl)zirconiumdimethyl,
Bis(benzylcyclopentadienyl)(pentamethylcyclopentadienyl)zirconiumdichloride,
Bis(propylcyclopentadienyl)(pentamethylcyclopentadienyl)zirconiumdimethyl,
Bis(propylcyclopentadienyl)(pentamethylcyclopentadienyl)zirconiumdichloride,
Bis(propylcyclopentadienyl)(tetramethylcyclopentadienyl)zirconiumdimethyl,
Bis(propylcyclopentadienyl)(tetramethylcyclopentadienyl)zirconiumdichloride,
Bis(tetramethyl,propylcyclopentadienyl)(pentamethylcyclopentadienyl)zirconiumdimethyl,
Bis(tetramethyl,propylcyclopentadienyl)(pentamethylcyclopentadienyl)zirconiumdichloride,
Bis(tetramethyl,propylcyclopentadienyl)(cyclopentadienyl)zirconiumdimethyl,
Bis(tetramethyl,propylcyclopentadienyl)(cyclopentadienyl)zirconiumdichloride,
Dimethylsilylbis(cyclopentadienyl)zirconiumdichloride,
Dimethylsilylbis(cyclopentadienyl)zirconiumdimethyl,
Dimethylsilylbis(cyclopentadienyl)zirconiumdimethoxide,
Dimethylsilylbis(cyclopentadienyl)zirconiumdiamide,
Dimethylsilylbis(cyclopentadienyl)zirconiumdifluoride,
Dimethylsilylbis(cyclopentadienyl)zirconiumdiiodide,
Dimethylsilylbis(cyclopentadienyl)zirconiumdibromide,
Dimethylsilylbis(pentamethylcyclopentadienyl)zirconiumdichloride,
Dimethylsilylbis(pentamethylcyclopentadienyl)zirconiumdimethyl,
Dimethylsilylbis(pentamethylcyclopentadienyl)zirconiumdifluoride,
Dimethylsilylbis(pentamethylcyclopentadienyl)zirconiumdimethoxide,
Dimethylsilylbis(pentamethylcyclopentadienyl)zirconiumdiamide,
Dimethylsilylbis(pentamethylcyclopentadienyl)zirconiumdibromide,
Dimethylsilylbis(pentamethylcyclopentadienyl)zirconiumdibenzyl,
Dimethylsilylbis(cyclopentadienyl)(pentamethylcyclopentadienyl)zirconiumdichloride,
Dimethylsilylbis(cyclopentadienyl)(pentamethylcyclopentadienyl)zirconiumdimethyl,
Dimethylsilylbis(cyclopentadienyl)(pentamethylcyclopentadienyl)zirconiumdimethoxide,
Dimethylsilylbis(cyclopentadienyl)(pentamethylcyclopentadienyl)zirconiumdibromide,
Dimethylsilylbis(cyclopentadienyl)(pentamethylcyclopentadienyl)zirconiumdiamide,
Dimethylsilylbis(cyclopentadienyl)(pentamethylcyclopentadienyl)zirconiumdifluoride,
Dimethylsilylbis(cyclopentadienyl)(pentamethylcyclopentadienyl)zirconiumdibenzyl,
Dimethylsilylbis(1-methyl,4-butylcyclopentadienyl)zirconiumdichloride,
Dimethylsilylbis(1-methyl,4-butylcyclopentadienyl)zirconiumdimethyl,
Dimethylsilylbis(1-methyl,4-butylcyclopentadienyl)zirconiumdimethoxide,
Dimethylsilylbis(1-methyl,4-butylcyclopentadienyl)zirconiumdibromide,
Dimethylsilylbis(1-methyl,4-butylcyclopentadienyl)zirconiumdifluoride,
Dimethylsilylbis(1-methyl,4-butylcyclopentadienyl)zirconiumdiamide,
Dimethylsilylbis(1-methyl,4-butylcyclopentadienyl)zirconiumdimethoxide,
Dimethylsilylbis(1-methyl,4-butylcyclopentadienyl)zirconiumdibenzyl,
Dimethylsilylbis(1-methyl,4-ethylcyclopentadienyl)zirconiumdichloride,
Dimethylsilylbis(1-methyl,4-ethylcyclopentadienyl)zirconiumdimethyl,
Dimethylsilylbis(1-methyl,4-benzylcyclopentadienyl)zirconiumdichloride,
Dimethylsilylbis(1-methyl,4-benzylcyclopentadienyl)zirconiumdimethyl,
Dimethylsilylbis(1-methyl,3-butylcyclopentadienyl)zirconiumdichloride, Dimethylsilylbis(1-methyl,3-butylcyclopentadienyl)zirconiumdimethyl,
Dimethylsilylbis(1-methyl,3-n-propylcyclopentadienyl)zirconiumdichloride,
Dimethylsilylbis(1-methyl,3-n-propylcyclopentadienyl)zirconiumdimethyl,
Dimethylsilylbis(1-methyl,3-iso-propylcyclopentadienyl)zirconiumdichloride,
Dimethylsilylbis(1-methyl,3-iso-propylcyclopentadienyl)zirconiumdimethyl,
Dimethylsilylbis(1,3-dimethylcyclopentadienyl)zirconiumdichloride,
Dimethylsilylbis(1,3-dimethylcyclopentadienyl)zirconiumdimethyl,
Dimethylsilylbis(n-propylcyclopentadienyl)zirconiumdichloride,
Dimethylsilylbis(n-propylcyclopentadienyl)zirconiumdimethyl,
Dimethylsilylbis(n-butylcyclopentadienyl)zirconiumdichloride,
Dimethylsilylbis(n-butylcyclopentadienyl)zirconiumdimethyl,
Dimethylsilylbis(tert-butylcyclopentadienyl)zirconiumdichloride,
Dimethylsilylbis(tert-butylcyclopentadienyl)zirconiumdimethyl,
Dimethylsilylbis(benzylcyclopentadienyl)zirconiumdichloride,
Dimethylsilylbis(benzylcyclopentadienyl)zirconiumdimethyl,
Dimethylsilylbis(benzylcyclopentadienyl)(pentamethylcyclopentadienyl)zirconiumdimethyl,
Dimethylsilylbis(benzylcyclopentadienyl)(pentamethylcyclopentadienyl)zirconiumdichloride,
Dimethylsilylbis(propylcyclopentadienyl)(pentamethylcyclopentadienyl)zirconiumdimethyl,
Dimethylsilylbis(propylcyclopentadienyl)(pentamethylcyclopentadienyl)zirconiumdichloride,
Dimethylsilylbis(propylcyclopentadienyl)(tetramethylcyclopentadienyl)zirconiumdimethyl,
Dimethylsilylbis(propylcyclopentadienyl)(tetramethylcyclopentadienyl)zirconiumdichloride,
Dimethylsilylbis(tetramethyl,propylcyclopentadienyl)(pentamethylcyclopentadienyl)zirconiumdimethyl,
Dimethylsilylbis(tetramethyl,propylcyclopentadienyl)(pentamethylcyclopentadienyl)zirconiumdichloride,
Dimethylsilylbis(tetramethyl,propylcyclopentadienyl)(cyclopentadienyl)zirconiumdimethyl, and
Dimethylsilylbis(tetramethyl,propylcyclopentadienyl)(cyclopentadienyl)zirconiumdichloride.

Polymerization Process

The supported activators of the invention and catalyst systems utilizing the supported activators described above are suitable for use in any prepolymerization and/or polymerization process over a wide range of temperatures and pressures. The temperatures may be in the range of from −60° C. to about 280° C., preferably from 50° C. to about 200° C. In another embodiment the polymerization temperature is above 0° C., above 50° C., above 80° C., above 100° C., above 150° C. or above 200° C. In one embodiment the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefin(s) at least one of which is ethylene or propylene.

In one embodiment, the process of the invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In another embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C. I another embodiment, the reactor temperature in a gas phase process is above 60° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200, EP-BI-0 649 992, EP-A-0 802 202 and EP-B-0 634 421 all of which are herein fully incorporated by reference.

In another embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In another embodiment, the slurry process temperature is above 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In another embodiment, the polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998, and 5,589,555 and PCT WO 99/32525, which are fully incorporated herein by reference.

In one embodiment of the process of the invention is the process, preferably a slurry or gas phase process is operated in the presence of the catalyst system of the invention and in the absence of or essentially free of any scavengers, such as triethylaluminum, trimethylaluminum, tri-isobutylaluminum, and tri-n-hexylaluminum and diethylaluminum chloride, dibutyl zinc and the like. This process is described in PCT publication WO 96/08520 and U.S. Pat. Nos. 5,712,352 and 5,763,543, which are herein fully incorporated by reference.

In another embodiment, the method of the invention provides for injecting the catalyst system of the invention into a reactor, particularly a gas phase reactor. The polymerization catalyst in liquid form can be fed with an activator, and/or a support, and/or a supported activator together or separately to a reactor. The injection methods described in PCT publication WO 97/46599, which are fully incorporated herein by reference, may be utilized.

In embodiments of the process of this invention, the catalyst system may be employed in liquid phase (solution, slurry, suspension, bulk phase or combinations thereof), in high pressure liquid, or supercritical fluid or gas phase processes. Each of these processes may be employed in single, parallel or series reactors. The liquid processes comprise contacting the ethylene and/or α-olefin and at least one vicinally disubstituted olefin monomer with the catalyst system described herein in a suitable diluent or solvent and allowing the monomers to react for a sufficient time to produce embodiments of the invention copolymers. One or more of the monomers used in the polymerization may be utilized as a solvent and/or diluent, generally in homogeneous polymerizations in the liquid monomer or monomers. Hydrocarbyl solvents are also suitable, both aliphatic and aromatic, including hexane and toluene. Bulk and slurry processes may typically be accomplished by contacting the catalysts with a slurry of liquid monomer, the catalyst system being supported. Gas phase processes may use a supported catalyst and may be conducted in any manner known to be suitable for producing ethylene homopolymers or copolymers via coordination polymerization. Illustrative examples may be found in U.S. Pat. Nos. 4,543,399, 4,588, 790, 5,028,670, 5,382,638, 5352,749, 5,436,304, 5,453,471, 5,463,999, and WO 95/07942. Each is incorporated by reference for purposes of U.S. patent practice.

Generally, the polymerization reaction temperature may vary from −50° C. to 250° C. The reaction temperature conditions may be from −20° C. to 220°, or below 200° C. The pressure may vary from 1 mm Hg to 2500 bar, or from 0.1 bar to 1600 bar, or from 1.0 to 500 bar. Where lower molecular weight copolymers, e.g., $M_n \leq 10,000$, are sought, it may be suitable to conduct the reaction processes at temperatures above 0° C. and pressures under 500 bar.

Polymer Products

The polymers produced by the process of the invention can be used in a wide variety of products and end-use applications. The polymers produced can be homo- and co-polymers of ethylene and propylene and include linear low density polyethylene, elastomers, plastomers, high-density polyethylenes, medium density polyethylenes, low density polyethylenes, polypropylene and polypropylene copolymers. Polymers, typically ethylene based copolymers, have a density of from 0.86 g/cc to 0.97 g/cc; density being measured in accordance with ASTM-D-1238. A description of elastomeric ethylene-α-olefin copolymers with respect to crystallinity appears U.S. Pat. No. 5,767,208 incorporated by reference for purposes of U.S. patent practice. The term "copolymer", as used herein, may mean a polymer derived from 2 or more monomeric types. Accordingly, polymers described as for instance, EP and EPB containing respectively ethylene, and propylene and ethylene, propylene, and 1-butene, will both be referred to as copolymers. α-Olefins thus comprise propylene, 1-butene, 1-pentene, 1-hexene, 1-heptene, 1-octene, 1-nonene, 1-decene, 1-dodecene, 4-methyl-1-pentene, 5-methyl-1-nonene, 3-methyl-1-pentene, 3,5,5-trimethyl-1-hexene, vinylcyclohexane, or combinations thereof. Diolefins include those described in the literature for ethylene copolymers, including for EPDM rubber, the disclosure of U.S. Pat. No. 5,767,208 above, may be relevant in this regard. Examples include straight chain acyclic diolefins, branched acyclic diolefins, single ring alicyclic diolefins, multi-ring alicyclic fused and bridged ring diolefins, cycloalkenyl-substituted alkenes or combinations thereof. Examples include 1,4-hexadiene, dicyclopentadiene, 5-ethylidene-2-norbornene, vinylcyclohexene, 5-vinyl-2-norbornene, or combinations thereof. Propylene based polymers produced include isotactic polypropylene, atactic polypropylene and random, block or impact copolymers.

The polymers of embodiments of the invention may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000. Additionally, copolymer of embodiments of the invention will comprise a molecular weight distribution (MWD) in the range of $\geq 1$, or $\geq 1.5$ or $\leq 6$, or $\leq 4$ or $\leq 3$.

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Polymers produced by the process of the invention and blends thereof are useful in such forming operations as film, sheet, and fiber extrusion and co-extrusion as well as blow molding, injection molding, roto-molding. Films include blown or cast films formed by coextrusion or by lamination useful as shrink film, cling film, stretch film, sealing film, oreinted films,

EXAMPLES

Polymerization Procedures

1. Propylene Polymerizations

Polymerizations of the supported catalysts described in Examples 1 and 2, as well as Comparative Examples 1 and 2, were conducted in a 1 L zipperclave reactor (Autoclave Engineers) equipped with a pneumatic stirrer, and a thermocouple for temperature control. Temperature was controlled by means of a water-cooled jacket. Pressure and temperature of the autoclave was monitored utilizing Labview.

All polymerizations were performed utilizing a triethylaluminum (TEAl) scavenger (0.25 mmol; 5 mL of a 0.05M toluene solution), 400 mL propylene, 7.5 psig (52 kPa) of hydrogen (in 1 L volume), a stirring speed of 500 rpm. Additionally, all experiments were conducted at 70° C. for 1 hour. Prior to each experiment, the 1 L autoclave reactor was purged with $N_2$ at 95° C. for an hour. In a nitrogen-filled drybox, to a 15 mL vial was added 5 mL of a 0.05M TEAl solution (in toluene). The vial was sealed with a septum and aluminum cap, removed from the drybox, and, while flushing with $N_2$, added to the reactor via cannula. After the addition of the scavenger, a 50 cc gas vessel pressurized to 30 psig (207 kPa) of hydrogen was connected to the autoclave, under a purge of nitrogen, and expanded into the 1 L autoclave until the vessel gauge read 7.5 psig (52 kPa). This was followed by the addition of 400 mL of liquid propylene. The $N_2$ inlet was then closed off and the reactor was vented to release the excess $N_2$. The stirrer was set at 500 rpm and the reactor was heated to 70° C. In the drybox, in a catalyst tube was added 20-50 mg of catalyst/mineral oil slurry and 5 mL of anhydrous toluene. Unless noted otherwise, all catalyst loadings are 0.015 mmol/g clay (ion exchange layered silicate). While flushing with $N_2$, the catalyst tube was mounted on the reactor, and the contents were added with high pressure $N_2$ (550 psig(3792 kPa)). The reaction mixture was stirred for an hour at 70° C. After this time, the reaction mixture was cooled and quenched by venting the propylene and exposing the contents to the atmosphere. The polymer was isolated, and dried at room temperature. Catalyst productivity was calculated by dividing the yield of polymer by the total weight of the catalyst charge by the time in hours.

2. Ethylene/Hexene Polymerizations

A. Examples (and Comparative Examples) 3 and 4.

Polymerizations of the supported catalysts described in Examples 3 and 4, as well as Comparative Examples 3 and 4, were conducted in a 1 L zipperclave reactor (Autoclave Engineers) equipped with a pneumatic stirrer, and a thermocouple for temperature control. Temperature was controlled by means of a dual heat and water-cooled jacket. Pressure and temperature of the autoclave was monitored utilizing Labview.

All polymerizations were performed utilizing triisobutylaluminum (TIBAl) as the scavenger, 10-30 mL anhydrous 1-hexene, 300 mL anhydrous hexane, at a continuous ethylene pressure of 130 psig (1137 kPa), and a stirring speed of 500 rpm. Additionally, all experiments were conducted at 85° C. for 40 minutes. In the drybox, 25-50 mg of catalyst was loaded in a catalyst tube and 5 mL of anhydrous toluene added via pipette into the tube. To a 15 mL vial was added 0.2-0.5 mL of TIBAl solution (1M in toluene) and 10-30 mL anhydrous 1-hexene. The vial was sealed with a septum and aluminum cap. The catalyst tube and TIBAl/1-hexene solutions were removed from the drybox, and while flushing with $N_2$, the catalyst tube was mounted on the reactor and the TIBAl/1-hexene solution was added to the reactor via cannula. The $N_2$ inlet was then closed off and the reactor was vented to release the excess $N_2$. Hexane (300 mL) was then added into the reactor. The reactor was vented again to release the excess $N_2$. The stirrer was set at 500 rpm and the reactor was heated to 85° C. The content of the catalyst tube was added into the reactor by pushing it with hexane (100 mL). Ethylene (130 psig (1137 kPa)) was then quickly added into the reactor and the flow was maintained constant over the course of the reaction. The reaction mixture was stirred for 40 minutes at 85° C. and was allowed to cool down before venting off the excess ethylene. The polymer was isolated by removing the volatiles at room temperature, followed by drying at 70° C. under vacuum for 2-3 hours.

B. Examples (and Comparative Examples) 5-11.

Polymerizations utilizing the supported catalyst systems prepared in Examples 5-11 and Comparative Examples (5-11) were performed in a glass-lined 22.5 mL autoclave reactor equipped with a mechanical stirrer, an external heater for temperature control, septum inlet and regulated supply of nitrogen and ethylene in an inert atmosphere (Nitrogen) glove box. The reactor was dried and degassed at 115° C. for 5 hours and then purged with nitrogen at room temperature for an additional five hours. The diluent, comonomer, and scavenger were added at room temperature and atmospheric pressure. Specifically, hexane (4.850 mL), tri-n-octylaluminum (4 mmol, 0.2 mL of 0.02 mol/l of tri-n-octylaluminum solution in hexane) and hexene (50 μL) were added at room temperature. The reactor was heated to process temperature (85° C.) while stirring at 800 rpm. Ethylene was added to a pressure of 130 psig(1137 kPa). The activator and catalyst [0.1 mL of toluene slurry (3 mg/mL)], were injected at process conditions. The polymerization was continued while maintaining the reaction vessel within 2° C. of the target process temperature (85° C.) and 2 psig (14 kPa) of target process pressure (130 psig (1137 kPa), by automatic addition of ethylene on demand). The reaction was quenched after a predetermined amount of ethylene had been consumed (cumulative ethylene amount of 75 psi(517 kPa)) or until a maximum reaction time of 40 minutes had elapsed. The reaction was quenched by pressurizing the reactor to 30 psig (207 kPa) above the target process pressure with a gas mixture composed of 5 mol % Oxygen in Argon. The reactor was then cooled, vented and the polymer recovered by vacuum centrifugation of the reaction mixture. Pertinent data for the polymers prepared by the catalyst systems of Examples 5-11, are summarized in Table 3.

Characterization for PPR Samples

For analytical testing, polymer sample solutions were prepared by dissolving the 2,6-di-tert-butyl-4-methylphenol (BHT, 99% purity was purchased from Aldrich) stabilized polymer in 1,2,4-trichlorobenzene (TCB 99+% purity from Aldrich; 5 gm of BHT in 4 L of TCB), at 160 ?C in a shaker oven for approximately 3 hours. The typical concentration of polymer in solution is between 0.4 to 0.9 mg/mL.

Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5000 and 3,390,000). Samples were run in TCB at (135° C. sample temperatures, 160° C. oven/columns) using three Polymer Laboratories: PLgel 10 m Mixed-B 300×7.5 mm columns in series. No column spreading corrections were employed. Numerical analyses were performed using Epoch® software available from Symyx Technologies.

Samples for infrared analysis were prepared by depositing the stabilized polymer solution onto a silanized wafer (Part number S10860, Symyx). By this method, approximately between 0.12 and 0.24 mg of polymer is deposited on the wafer cell. The samples were subsequently analyzed on a Brucker Equinox 55 FTIR spectrometer equipped with Pikes's MappIR specular reflectance sample accessory. Spectra, covering a spectral range of 5000 cm-1 to 500 cm-1, were collected at a 2 cm-1 resolution with 32 scans.

For ethylene hexene, the wt. % copolymer is determined via measurement of the methyl deformation band at ~1375 cm-1. The peak height of this band is normalized by the combination and overtone band at ~4321 cm-1, which corrects for path length differences. The normalized peak height is correlated to individual calibration curves from H-NMR data to predict the wt. % copolymer content within a concentration range of ~2 to 25 wt. % for butene and hexene and ~2 to 35 wt. % for octene. Typically, R2 correlations of 0.98 or greater are achieved.

DSC for PP Samples

Thermal analysis was done using a 1290 TA Instruments DSC by first heating the sample from 25° C. to 220° C. at 10° C./min, isotherm at 220° C. for 10 minutes, then cooling at 10° C./min from 220° C. to 25° C. and finally again heating to 220° C. at 10° C./min. The second heat results have been reported.

Example 1

(1-1) Chemical Treatment of Ion-Exchanged Layered Silicate

BenClay SL (100 g, obtained from Mizusawa Industrial Chemicals Ltd.) was stirred with 100 g sulfuric acid (96% $H_2SO_4$) in 376.5 g water at 90° C. for 6 hr. After cooling to room temperature overnight, the clay was washed repeatedly with, distilled water and separated by centrifugation until the pH of the final supernatant was 3. This required 5 to 10 washes. Two additional 100 g batches were treated with acid as above. The combined washed clay sample was dried in air at 130° C. for 48 hr. 211.1 g (70%) dried clay was recovered. The surface area was 285 $m^2$/g. Elemental analysis found 4.7% Al and 32.3% Si for an Al/Si molar ratio of 0.152. In all cases, prior to further chemical treatment, the acid-treated clay was dried in an anhydrous nitrogen stream at 200° C. for 6 hours and stored in a drybox (oxygen<2 ppm; water<1 ppm) for future use.

(1-2) Addition of Organoaluminum Compounds to Acid-Treated Clay

In the drybox, to a 250 ml round bottom flask equipped with a magnetic stirbar was added 20.231 grams of the freshly dried acid-treated Benclay SL and approximately 80 ml of anhydrous toluene. While stirring the slurry at room temperature, neat triethylaluminum (5.077 g, 0.045 mole) was slowly added dropwise. Immediately the flask became warm and the stirring was stopped after 1 h. This slurry was allowed to stand for an additional 3 hours, with periodic stirring (1-2 minutes) every 15-20 minutes. The slurry was filtered, washed with toluene (3×25 mL) and heptane (1×25 mL) and dried in vacuo overnight (~15 hours). TEAL-treated clay samples were recovered in >90% yield and stored in the drybox freezer (−35° C.) until they were to be used.

(1-3) Synthesis of Indole-Modified Activator

In the drybox, to a 250 ml round bottom flask was added the TEAL-treated Benclay (10.390 g, as described in 1-2) and 100 mL of anhydrous o-xylene. To the stirred slurry was added an o-xylene solution of 4,5,6,7-tetrafluoroindole (1.891 g, 0.010 mole). After stirring for 15 minutes, the stirring was stopped and the reaction mixture was heated to 100° C. During this time, the reaction mixture was stirred periodically for 1-2 minutes every 15-20 minutes. After the first 30 minutes at 100° C., the color of the solution turns from colorless to golden yellow. The reaction mixture was allowed to cool to room temperature and collected by vacuum filtration to give a yellow (golden) solid and a pale yellow solution. The solid was washed with toluene (3×50 mL) and dried in vacuo for ~15 hours. Indole-modified clay samples were recovered in >90% yield and stored in the drybox freezer (−35° C.) until they were to be used.

(1-4) Metallocene Addition to Activator System

In the drybox, to a 100 mL round bottom flask, equipped with a stirbar, was added 4.2 g of the indole-modified alkyl aluminum treated clay (as described in 1-3), 35 mL of anhydrous toluene, and rac-dimethylsilylbis[(2-methyl-4-phenyl)indenyl]zirconiumdimethyl (0.040 g, 0.068 mmol) as a toluene slurry with stirring. Immediately the color of the slurry turns reddish. Over time, the color of the slurry faded from red to a yellow/green color. Stirring was continued periodically (1-2 minutes, every 30 minutes over a 3 hour period). The stirring was stopped and the reaction mixture was allowed to stand for ~15 h. After this time, the reaction mixture was filtered, washed with toluene (3×25 mL), and dried in vacuo for 6 hours. The catalyst was slurried in mineral oil (10 wt. %) for future polymerization runs.

(1-5) Polymerization of Propylene

Propylene polymerizations were conducted as described by procedure 1. The polymerization data is summarized in Table 1.

Comparative Example 1

Comparative (1-4) Metallocene Addition to Activator System

The activator system described in (1-1 and 1-2) was utilized as the starting support. In a 50 mL round bottom flask, equipped with a stirbar, was added 4.003 g of the activator support (1-2) and ~25 mL anhydrous toluene. To the stirred slurry was added rac-dimethylsilylbis[(2-methyl-4-phenyl)indenyl]zirconiumdimethyl (0.035 g, 0.060 mmol, 0.015 mmol/g clay), as a toluene slurry (~10 ml toluene), dropwise over the course of 5 minutes. Upon addition of the metallocene, the color of the slurry turned pink or red, and as the reaction mixture was allowed to stand, faded to a dark green/brown. During this time, the slurry was only stirred periodically (~1-2 minutes) every 15-20 minutes for the first 6 hours and subsequently allowed to stand for an additional 9 hours. After this time, the solution was filtered, washed with toluene (3×25 mL) and heptane (1×10 mL) and dried in vacuo for 15 hours. The solid was recovered in high yield (>90%) and stored in the drybox freezer (−35° C.) for future use.

Comparative (1-5) Polymerization of Propylene

Propylene polymerizations were conducted as described by procedure 1. The polymerization data is summarized in Table 1.

Example 2

(2-4) Metallocene Addition to Activator System

In the drybox, to a 100 mL round bottom flask, equipped with a stirbar, was added 5.03 g of the indole-modified alkyl aluminum treated clay (as described in 1-3), 50 mL of anhydrous toluene. To this slurry was added a toluene slurry of rac-dimethylsilylbis[(2-methyl-4-phenyl)indenyl]zirconiumdimethyl (0.014 g, 0.024 mmol; 0.005 mmol cat/g clay) with stirring. Immediately the color of the slurry turned reddish. Over time, the color of the slurry faded from red to a yellow/green color. Stirring was continued only intermittently (1-2 minutes, every 15 minutes). The stirring was stopped and the reaction mixture was allowed to stand for an additional 1.5 hours. After this time, the reaction mixture was filtered, washed with toluene (3×25 mL), and dried in vacuo for 6 hours. The catalyst was slurried in mineral oil (10 wt. %) for future polymerization runs.

(2-5) Polymerization of Propylene

Propylene polymerizations were conducted as described by procedure 1. The polymerization data is summarized in Table 1.

Comparative Example 2

Comparative (2-4) Metallocene Addition to Activator System

The activator system described in (1-2) was utilized as the starting support. In a 100 mL round bottom flask, equipped with a stirbar, was added 5.02 g of the activator support (1-2) and ~50 mL anhydrous toluene. To the stirred slurry was added rac-dimethylsilylbis[(2-methyl-4-phenyl)indenyl]zirconiumdichloride (0.045 g, 0.075 mmol, 0.015 mmol/g clay), as a toluene slurry, over the course of 5 minutes. Upon addition of the metallocene, the color of the slurry turned green. The stirring was stopped and the solution was allowed to react for 15 hours at room temperature. During this time, the slurry was only stirred periodically (~1-2 minutes) every 15-20 minutes for the first 6 hours and subsequently allowed to stand for an additional 9 hours. After this time, the solution was filtered, washed with toluene (3×25 mL) and heptane (1×10 mL) and dried in vacuo for 15 hours. The solid was recovered in high yield (>90%) and stored in the drybox freezer (−35° C.) for future use.

Comparative (2-5) Polymerization of Propylene

Propylene polymerizations were conducted as described below. The polymerization data is summarized in Table 1.

Example 3

(3-4) Metallocene Addition to Activator System

An activator system prepared according to (1-3) was utilized as the starting support. In a 100 mL round bottom flask, equipped with a stirbar, was added 2.138 g of the indole-modified activator support (1-3) and 25 mL anhydrous toluene. To the stirred slurry was added (1,3-MeBuCp)$_2$ZrMe$_2$[3.9 mL of 0.0166 M solution (0.649 g/100 mL toluene); 0.064 mmol; 0.030 mmol/g clay] as a toluene solution over the course of 5 minutes. The stirring was stopped and the solution was allowed to react for 6 hours at room temperature. During this time, the slurry was only stirred occasionally (~1-2 minutes) every 30 minutes. After this time, the solution was filtered, washed with toluene (3×25 mL) and heptane (1×10 mL) and dried in vacuo for 15 hours. An orange solid was recovered in high yield (>90%) and stored in the drybox freezer (−35° C.) for future use.

(3-5) Polymerization of Ethylene/Hexene

Ethylene/hexene polymerizations were conducted as described by procedure 2a. The polymerization data is summarized in Table 2.

Comparative Example 3

Comparative (3-4) Metallocene Addition to Activator System

The activator system described in (1-2) was utilized as the starting support. In a 50 mL round bottom flask, equipped with a stirbar, was added 2.114 g of the activator support (1-2) and 25 mL anhydrous toluene. To the stirred slurry was added (1,3-MeBuCp)$_2$ZrMe$_2$[3.8 mL of 0.0166 M solution (0.649 g/100 mL toluene); (0.0248 mg, 0.063 mmol); 0.030 mmol/g clay] dropwise over the course of 5 minutes. The stirring was stopped and the solution was allowed to react for 6 hours at room temperature. During this time, the slurry was only stirred occasionally (~1-2 minutes) every 15-20 minutes. After this time, the solution was filtered, washed with toluene (3×25 mL) and heptane (1×10 mL) and dried in vacuo for 15 hours. The solid was recovered in high yield (>90%) and stored in the drybox freezer (−35° C.) for future use.

Comparative (3-5) Polymerization of Ethylene/Hexene

Ethylene/hexene polymerizations were conducted as described by procedure 2a. The polymerization data is summarized in Table 2.

Example 4

(4-3) Synthesis of Indole-Modified Activator

K10 Montmorillonite was purchased from Aldrich Chemical Co. and dried in an inert, anhydrous nitrogen stream at 200° C. for 6 hours and immediately transferred (under an inert, anhydrous N2 atmosphere) to a nitrogen purged drybox. Subsequent TEAl-treatments and indole-modifications were conducted as described in (1-2) and (1-3) respectively.

(4-4) Metallocene Addition to Activator System

The activator system described in (4-3) above was utilized as the starting support. In a 100 mL round bottom flask, equipped with a stirbar, was added 2.00 g of the indole-modified activator support (4-3) and 35 mL anhydrous toluene. To the stirred slurry was added 0.220 g of a 10 wt. % solution of $(1,3\text{-MeBuCp})_2\text{ZrMe}_2$ (0.022 g, 0.056 mmol, 0.028 mmol/g clay) dropwise over the course of 5 minutes. The stirring was stopped and the solution was allowed to react for 6 hours at room temperature. During this time, the slurry was only stirred occasionally (~5 minutes) every 30 minutes. After this time, the solution was filtered, washed with toluene (3×25 mL) and heptane (1×10 mL) and dried in vacuo for 15 hours. An orange solid was recovered in high yield (>90%) and stored in the drybox freezer (−35° C.) for future use.

(4-5) Polymerization of Ethylene/Hexene

Ethylene/hexene polymerizations were conducted as described by procedure 2a. The polymerization data is summarized in Table 2.

Comparative Example 4

Comparative (4-4) Metallocene Addition to Activator System

The activator system describe in (4-2) was utilized as the starting support. In a 100 mL round bottom flask, equipped with a stirbar, was added 3.00 g of the activator support (4-2) and 35 mL anhydrous toluene. To the stirred slurry was added 0.328 g of a 10 wt. % toluene solution of $(1,3\text{-MeBuCp})_2\text{ZrMe}_2$ (0.033 g, 0.084 mmol, 0.028 mmol/g clay) dropwise over the course of 5 minutes. The stirring was stopped and the solution was allowed to react for 6 hours at room temperature. During this time, the slurry was only stirred occasionally (~5 minutes) every 15-20 minutes. After this time, the solution was filtered, washed with toluene (3×25 mL) and heptane (1×10 mL) and dried in vacuo for 15 hours. The solid was recovered in high yield (>90%) and stored in the drybox freezer (−35° C.) for future use.

Comparative (4-5) Polymerization of Ethylene/Hexene

Ethylene/hexene polymerizations were conducted as described by procedure 2a. The polymerization data is summarized in Table 2.

Example 5

(5-5) Polymerization of Ethylene/Hexene

Ethylene/hexene polymerization utilizing the catalyst prepared in (3-4) was conducted under the reaction conditions described in procedure 2b. Polymerization data is summarized in Table 3.

Comparative Example 5

Comparative (5-4) Metallocene Addition to Activator System

The activator system described in (1-2) was utilized as the starting support. In a 100 mL round bottom flask, equipped with a stirbar, was added 2.131 g of the activator support (1-2) and 25 mL anhydrous toluene. To the stirred slurry was added a solution of $(1,3\text{-MeBuCp})_2\text{ZrMe}_2$ [3.9 mL of 0.0166 M solution (0.649 g/100 mL toluene); 0.025 g, 0.060 mmol; 0.030 mmol/g clay] dropwise over the course of 5 minutes. The stirring was stopped and the solution was allowed to react for 6 hours at room temperature. During this time, the slurry was only stirred occasionally (~5 minutes) every 30 minutes. After this time, the solution was filtered, washed with toluene (3×25 mL) and heptane (1×10 mL) and dried in vacuo for 15 hours. The solid was recovered in high yield (>90%) and stored in the drybox freezer (−35° C.) for future use.

Comparative (5-5) Polymerization of Ethylene/Hexene

Ethylene/hexene polymerizations were conducted as described by procedure 2b. The polymerization data is summarized in Table 3.

Example 6

(6-4) Metallocene Addition to Activator System

The activator system described in (4-3) was utilized as the starting support. In a 30 mL vial, equipped with a stirbar, was added 2.428 g of the indole-modified activator support (4-3) and 25 mL anhydrous toluene. To the stirred slurry was added $(1,3\text{-MeBuCp})_2\text{ZrMe}_2$ (0.029 g, 0.056 mmol, 0.028 mmol/g clay) as a toluene solution, dropwise over the course of 5 minutes. The stirring was stopped after 15 minutes and the solution was allowed to stand at room temperature overnight. After this time, the solution was filtered, washed with toluene (3×10 mL) and heptane (1×10 mL) and dried in vacuo for 15 hours. A yellow-green solid was recovered in high yield (>90%) and stored in the drybox freezer (−35° C.) for future use.

(6-5) Polymerization of Ethylene/Hexene

Ethylene/hexene polymerizations were conducted as described by procedure 2b. The polymerization data is summarized in Table 3.

Comparative Example 6

Comparative (6-4) Metallocene Addition to Activator System

The activator system describe in (4-2) was utilized as the starting support. In a 50 mL round bottom flask, equipped with a stirbar, was added 3.077 g of the activator support (4-2) and 25 mL anhydrous toluene. To the stirred slurry was added $(1,3\text{-MeBuCp})_2\text{ZrMe}_2$ [0.035 g, 0.089 mmol; 0.029 mmol/g clay] dropwise over the course of 5 minutes. The stirring was stopped and the solution was allowed to stand overnight at room temperature and stored at −35° C. for an additional 2 days. After this time, the solution was filtered, washed with toluene (3×10 mL) and heptane (1×10 mL) and dried in vacuo for 15 hours. The yellow-green solid was recovered in high yield (>90%) and stored in the drybox freezer (−35° C.) for future use.

Comparative (6-5) Polymerization of Ethylene/Hexene

Ethylene/hexene polymerizations were conducted as described by procedure 2b. The polymerization data is summarized in Table 3.

Example 6A (6A-4) Metallocene Addition to Activator System

The activator system describe in (4-3) was utilized as the starting support. In a 25 mL round bottom flask, equipped with a stirbar, was added 2.00 g of the indole-modified activator support (4-3) and 15 mL anhydrous toluene. To the stirred slurry was added (1,3-MeBuCp)$_2$ZrMe$_2$ as a 10 wt. % toluene solution (0.220 g of a 10 wt. % solution; 0.022 g, 0.056 mmol, 0.028 mmol/g clay), dropwise over the course of 5 minutes. The stirring was stopped after 15 minutes and the solution was allowed to stand at room temperature for 6 hours. After this time, the solution was filtered, washed with toluene (3×10 mL) and heptane (1×10 mL) and dried in vacuo for 15 hours. A yellowish solid was recovered in high yield (>90%) and stored in the drybox freezer (−35° C.) for future use.

(6A-5) Polymerization of Ethylene/Hexene

Ethylene/hexene polymerizations were conducted as described by procedure 2b. The polymerization data is summarized in Table 3.

Comparative Example 6A

Comparative (6A-4) Metallocene Addition to Activator System

The activator system describe in (4-2) was utilized as the starting support. In a 50 mL round bottom flask, equipped with a stirbar, was added 3.00 g of the TEAL-treated clay (4-2) and 25 mL anhydrous toluene. To the stirred slurry was added (1,3-MeBuCp)$_2$ZrMe$_2$ as a 10 wt. % toluene solution (0.328 g of a 10 wt. % solution; 0.033 g, 0.089 mmol, 0.030 mmol/g clay) as a toluene solution, dropwise over the course of 5 minutes. The stirring was stopped after 15 minutes and the solution was allowed to stand at room temperature for 6 hours. After this time, the solution was filtered, washed with toluene (3×10 mL) and heptane (1×10 mL) and dried in vacuo for 15 hours. A yellowish solid was recovered (2.11 g) and stored in the drybox freezer (−35° C.) for future use.

Comparative (6A-5) Polymerization of Ethylene/Hexene

Ethylene/hexene polymerizations were conducted as described by procedure 2b. The polymerization data is summarized in Table 3.

Example 7

(7-3) Preparation of Activator System

The clay as prepared in (1-1) was utilized as described, with the exception that the dried clay was ground using a mortar and pestle, in the drybox, to afford a finer, more uniform clay particle size. The subsequent steps (1-2) and (1-3) were conducted as described above on the ground clay.

(7-4) Metallocene Addition to Activator System

The activator system describe in (7-3) was utilized as the starting support. In a 25 mL round bottom flask, equipped with a stirbar, was added 2.00 g of the indole-modified activator support (7-3) and 15 mL anhydrous toluene. To the stirred slurry was added (1,3-MeBuCp)$_2$ZrMe$_2$ as a 10 wt. % toluene solution (0.220 g of a 10 wt. % solution; 0.022 g, 0.056 mmol, 0.028 mmol/g clay) as a toluene solution, dropwise over the course of 5 minutes. The stirring was stopped after 15 minutes and the solution was allowed to stand at room temperature for 2 hours. After this time, the solution was filtered, washed with toluene (3×10 mL) and heptane (1×10 mL) and dried in vacuo for 15 hours. A yellowish solid was recovered in high yield (>90%) and stored in the drybox freezer (−35° C.) for future use.

(7-5) Polymerization of Ethylene/Hexene

Ethylene/hexene polymerizations were conducted as described by procedure 2b. The polymerization data is summarized in Table 3.

Comparative Example 7

Comparative (7-4) Metallocene Addition to Activator System

The activator system describe in (7-3) was utilized as the starting support, with the exception that the clay was only TEAl-treated. In a 50 mL round bottom flask, equipped with a stirbar, was added 2.00 g of the TEAl-treated clay support (x-2) and 25 mL anhydrous toluene. To the stirred slurry was added (1,3-MeBuCp)$_2$ZrMe$_2$ as a 10 wt. % toluene solution (0.220 g of a 10 wt. % solution; 0.022 g, 0.056 mmol, 0.028 mmol/g clay), dropwise over the course of 5 minutes. The stirring was stopped after 15 minutes and the solution was allowed to stand at room temperature for 6 hours. After this time, the solution was filtered, washed with toluene (3×10 mL) and heptane (1×10 mL) and dried in vacuo for 15 hours. A yellowish solid was recovered (2.11 g) and stored in the drybox freezer (−35° C.) for future use.

Comparative (7-5) Polymerization of Ethylene/Hexene

Ethylene/hexene polymerizations were conducted as described by procedure 2b. The polymerization data is summarized in Table 3.

Example 8

(8-3) Preparation of Activator System

Benclay SL was prepared as described in (1-1) and dried at 200° C. for 6 hours in an anhydrous nitrogen stream. The clay particles >600 microns were isolated by utilizing a 30 mesh sieve in the drybox. These larger particle sizes were ground using a mortar and pestle to afford clay particle sizes <250 microns (60 mesh sieve). The subsequent steps (1-2) and (1-3) were conducted as described above on this ground clay.

(8-4) Metallocene Addition to Activator System

The activator system as described in (8-3) was prepared and utilized as the starting support. In a 50 mL round bottom flask, equipped with a stirbar, was added 2.449 g of the indole-modified activator support (8-3) and 25 mL anhydrous toluene. To the stirred slurry was added (1,3-MeBuCp)$_2$ZrMe$_2$ [4.4 mL of 0.0166 M solution (0.649 g/100 mL toluene); 0.029 g; 0.064 mmol; 0.030 mmol/g clay] dropwise over the course of 5 minutes. The stirring was stopped after 15 minutes and the solution was allowed to stand for 6 hours at room temperature. After this time, the solution was filtered, washed with toluene (3×10 mL) and heptane (1×10 mL) and dried in vacuo for 15 hours. A yellow-orange solid was recovered in high yield (>90%) and stored in the drybox freezer (−35° C.) for future use.

(8-5) Polymerization of Ethylene/Hexene

Ethylene/hexene polymerizations were conducted as described by procedure 2b. The polymerization data is summarized-in Table 3.

Comparative Example 8

Comparative (8-4) Metallocene Addition to Activator System

The clay described in Example (8-3) was utilized as the starting support, with the exception that the clay was only TEAl-treated, as described in (1-2). In a 50 mL round bottom flask, equipped with a stirbar, was added 2.504 g of the teal-treated clay support (8-2) and 25 mL anhydrous toluene. To the stirred slurry was added (1,3-MeBuCp)$_2$ZrMe$_2$ [4.4 mL of 0.0166 M solution (0.649 g/100 mL toluene); 0.029 g; 0.064 mmol; 0.030 mmol/g clay], dropwise over the course of 5 minutes. The stirring was stopped after 15 minutes and the solution was allowed to stand at room temperature for 6 hours. After this time, the solution was filtered, washed with toluene (3×10 mL) and heptane (1×10 mL) and dried in vacuo for 15 hours. A yellowish solid was recovered (2.11 g) and stored in the drybox freezer (−35° C.) for future use.

Comparative (8-5) Polymerization of Ethylene/Hexene

Ethylene/hexene polymerizations were conducted as described by procedure 2b. The polymerization data is summarized in Table 3.

Example 9

(9-1) Chemical Treatment of Ion-Exchanged Layered Silicate 50 g BenClay SL was stirred with 108 g sulfuric acid (96% H$_2$SO$_4$) in 190 g water at 100° C. for 2 hr. After cooling to room temperature overnight, the clay was washed repeatedly with distilled water and separated by centrifugation until the pH of the final wash was 3. The washed clay was dried in air at 130° C. for 48 hr. 31.9 g (64%) dried clay was recovered. The surface area was 247 m$^2$/g. Elemental analysis found 3.65% Al and 37.6% Si for an Al/Si molar ratio of 0.101. In all cases, prior to further chemical treatment, the acid-treated clay was dried in an anhydrous nitrogen stream at 200° C. for 6 hours and stored in a drybox (oxygen<2 ppm; water<1 ppm) for future use.

(9-3) Preparation of Activator System

The activator system was prepared in an analogous manner as described in 1-2 and 1-3, with the exception that the layered silicate material described above (9-1) was utilized.

(9-4) Metallocene Addition to Activator System

In a 100 mL round bottom flask, equipped with a stirbar, was added 2.007 g of the indole-modified activator support (5-3) and 25 mL anhydrous toluene. To the stirred slurry was added (1,3-MeBuCp)$_2$ZrMe$_2$ [3.6 mL of 0.0166 M solution (0.649 g/100 mL toluene); 0.0236 g, 0.060 mmol; 0.030 mmol/g clay] dropwise over the course of 5 minutes. The stirring was stopped and the solution was allowed to react for 6 hours at room temperature. During this time, the slurry was only stirred occasionally (~5 minutes) every 30 minutes. After this time, the solution was filtered, washed with toluene (3×25 mL) and heptane (1×10 mL) and dried in vacuo for 15 hours. An orange solid was recovered in high yield (>90%) and stored in the drybox freezer (−35° C.) for future use.

(9-5) Polymerization of Ethylene/Hexene

Ethylene/hexene polymerizations were conducted as described by procedure 2b. The polymerization data is summarized in Table 3.

Comparative Example 9

Comparative (9-4) Metallocene Addition to Activator System

The clay described in Example (9-1) was utilized as the starting support. This support was subjected to TEAl-treatment as described in Example (1-2). In a 50 mL round bottom flask, equipped with a stirbar, was added 2.131 g of the TEAl-treated clay support (9-2) and 25 mL anhydrous toluene. To the stirred slurry was added (1,3-MeBuCp)$_2$ZrMe$_2$ [3.9 mL of 0.0166 M solution (0.649 g/100 mL toluene); 0.025 g, 0.064 mmol; 0.030 mmol/g clay], dropwise over the course of 5 minutes. The stirring was stopped after 15 minutes and the solution was allowed to stand at room temperature for 6 hours. After this time, the solution was filtered, washed with toluene (3×10 mL) and heptane (1×10 mL) and dried in vacuo for 15 hours. A yellowish solid was recovered in high yield (>90%) and stored in the drybox freezer (−35° C.) for future use.

Comparative (9-5) Polymerization of Ethylene/Hexene

Ethylene/hexene polymerizations were conducted as described by procedure 2b. The polymerization data is summarized in Table 3.

Example 10

(10-1) Chemical Treatment of Ion-Exchanged Layered Silicate 50 g BenClay SL was stirred with 108 g sulfuric acid (96% H$_2$SO$_4$) and 66 g MgSO$_4$ 7H$_2$O in 190 g water at 100° C. for 2 hr. After cooling to room temperature overnight, the clay was washed repeatedly with distilled water and separated by centrifugation until the pH of the final wash was 3. The washed clay was dried in air at 130° C. for 48 hr. 34.4 g (69%) dried clay was recovered. The surface area was 248 m$^2$/g. Elemental analysis found 4.21% Al and 36.2% Si for an Al/Si molar ratio of 0.121. In all cases, prior to further chemical treatment, the acid-treated clay was dried in an anhydrous nitrogen stream at 200° C. for 6 hours and stored in a drybox (oxygen<2 ppm; water<1 ppm) for future use.

(10-3) Preparation of Activator System

The activator system was prepared in an analogous manner as described in 1-2 and 1-3, with the exception that the layered silicate material described above (10-1) was utilized.

(10-4) Metallocene Addition to Activator System

In a 100 mL round bottom flask, equipped with a stirbar, was added 2.007 g of the indole-modified activator support (10-3) and 25 mL anhydrous toluene. To the stirred slurry was added (1,3-MeBuCp)$_2$ZrMe$_2$ [3.6 mL of 0.0166 M solution (0.649 g/100 mL toluene); 0.0236 g, 0.060 mmol; 0.030 mmol/g clay] as a toluene solution, dropwise over the course of 5 minutes. The stirring was stopped and the solution was allowed to react for 6 hours at room temperature. During this time, the slurry was only stirred occasionally (~5 minutes) every 30 minutes. After this time, the solution was filtered, washed with toluene (3×25 mL) and heptane (1×10 mL) and dried in vacuo for 15 hours. An orange solid was recovered in high yield (>90%) and stored in the drybox freezer (−35° C.) for future use.

(10-5) Polymerization of Ethylene/Hexene

Ethylene/hexene polymerizations were conducted as described by procedure 2b. The polymerization data is summarized in Table 3.

Comparative Example 10

Comparative (10-4) Metallocene Addition to Activator System

The clay described in Example (10-1) was utilized as the starting support. This support was subjected to TEAl-treatment as described in Example (1-2). In a 50 mL round bottom flask, equipped with a stirbar, was added 1.993 g of the teal-treated clay support (10-2) and 25 mL anhydrous toluene. To the stirred slurry was added (1,3-MeBuCp)$_2$ZrMe$_2$ [3.6 mL of 0.0166 M solution (0.649 g/100 mL toluene); 0.023 g, 0.060 mmol; 0.030 mmol/g clay], dropwise over the course of 5 minutes. The stirring was stopped after 15 minutes and the solution was allowed to stand at room temperature for 6 hours. After this time, the solution was filtered, washed with toluene (3×10 mL) and heptane (1×10 mL) and dried in vacuo for 15 hours. A yellowish solid was recovered in high yield (>90%) and stored in the drybox freezer (−35° C.) for future use.

Comparative (10-5) Polymerization of Ethylene/Hexene

Ethylene/hexene polymerizations were conducted as described by procedure 2b. The polymerization data is summarized in Table 3.

Example 11

(11-1) Chemical Treatment of Ion-Exchanged Layered Silicate 50 g BenClay SL was stirred with 54 g sulfuric acid (96% $H_2SO_4$) and 66 g $MgSO_4 \cdot 7H_2O$ in 190 g water at 100° C. for 2 hr. After cooling to room temperature overnight, the clay was washed repeatedly with distilled water and separated by centrifugation until the pH of the final wash was 3. The washed clay was dried in air at 130° C. for 48 hr. 35.7 g (71%) dried clay was recovered. The surface area was 278 $m^2/g$. Elemental analysis found 5.99% Al and 33.9% Si for an Al/Si molar ratio of 0.184. In all cases, prior to further chemical treatment, the acid-treated clay was dried in an anhydrous nitrogen stream at 200° C. for 6 hours and stored in a drybox (oxygen<2 ppm; water<1 ppm) for future use.

(11-3) Preparation of Activator System

The activator system was prepared in an analogous manner as described in 1-2 and 1-3, with the exception that the layered silicate material described above (11-1) was utilized.

(11-4) Metallocene Addition to Activator System

In a 100 mL round bottom flask, equipped with a stirbar, was added 2.008 g of the indole-modified activator support (11-3) and 25 mL anhydrous toluene. To the stirred slurry was added $(1,3\text{-MeBuCp})_2ZrMe_2$ [3.6 mL of 0.0166 M solution (0.649 g/100 mL toluene); 0.0236 g, 0.060 mmol; 0.030 mmol/g clay] dropwise over the course of 5 minutes. The stirring was stopped and the solution was allowed to react for 6 hours at room temperature. During this time, the slurry was only stirred occasionally (~5 minutes) every 30 minutes. After this time, the solution was filtered, washed with toluene (3×25 mL) and heptane (1×10 mL) and dried in vacuo for 15 hours. An orange solid was recovered in high yield (>90%) and stored in the drybox freezer (−35° C.) for future use.

(11-5) Polymerization of Ethylene/Hexene (23831-70)

Ethylene/hexene polymerizations were conducted as described by procedure 2b. The polymerization data is summarized in Table 3.

Comparative Example 11

Comparative (11-4) Metallocene Addition to Activator System

The clay described in Example (11-1) was utilized as the starting support. This support was subjected to TEAL-treatment as described in Example (1-2). In a 50 mL round bottom flask, equipped with a stirbar, was added 2.022 g of the TEAL-treated clay support (11-2) and 25 mL anhydrous toluene. To the stirred slurry was added $(1,3\text{-MeBuCp})_2ZrMe_2$ [3.7 mL of 0.0166 M solution (0.649 g/100 mL toluene); 0.024 g, 0.061 mmol; 0.030 mmol/g clay], as a toluene solution, dropwise over the course of 5 minutes. The stirring was stopped after 15 minutes and the solution was allowed to stand at room temperature for 6 hours. After this time, the solution was filtered, washed with toluene (3×10 mL) and heptane (1×10 mL) and dried in vacuo for 15 hours. A yellowish solid was recovered in high yield (>90%) and stored in the drybox freezer (−35° C.) for future use.

Comparative (11-5) Polymerization of Ethylene/Hexene

Ethylene/hexene polymerizations were conducted as described by procedure 2b. The polymerization data is summarized in Table 3.

TABLE 1

Polymerization Data Utilizing Catalyst Systems of Examples 1 and 2.

| Prep. | Amt of cat. (mg) | Yield (g) | Catalyst Productivity (g pol./g cat.) | Mw (×10$^5$) | Mw/Mn | Bulk Density (g/cm$^3$) | DSC 2nd melt (C.) |
|---|---|---|---|---|---|---|---|
| Example 1 | 26.2 | 57.57 | 2197 | 3.08 | 13.1 | 0.395 | 150.9 |
| Example 1 | 26.7 | 80.53 | 3016 | 3.45 | 5.6 | 0.421 | 151.3 |
| Example 1 | 25.6 | 38.45 | 1502 | 2.81 | 9.7 | 0.391 | 149.9 |
| Example 1 | 26.8 | 54.09 | 2018 | 3.14 | 11.8 | 0.400 | 150.8 |
| Average | 26.3 | 57.66 | 2183 | 3.1 | 10.0 | 0.402 | 150.7 |
| Comparative Example 1 | 24.5 | 31.76 | 1296 | 2.47 | 6.3 | 0.427 | 148.4 |
| Comparative Example 1 | 25.1 | 37.96 | 1512 | 2.19 | 6.2 | 0.424 | 147.5 |
| Comparative Example 1 | 25.9 | 38.76 | 1497 | 1.98 | 8.8 | 0.429 | 147.1 |
| Comparative Example 1 | 27.5 | 40.18 | 1461 | 1.95 | 9.4 | 0.418 | 148.2 |
| Comparative Example 1 | 24.8 | 34.61 | 1396 | 1.78 | 9.0 | 0.416 | 148.3 |
| Average | | | 1432 | 2.07 | 7.9 | 0.423 | 147.9 |
| Example 2 | 50.1 | 35.26 | 704 | 4.36 | 11.9 | 0.461 | 150.9 |
| Example 2 | 51.0 | 32.10 | 629 | 3.15 | 11.8 | 0.444 | 151.1 |
| Example 2 | 49.2 | 37.32 | 759 | 3.02 | 13.1 | 0.445 | 151.1 |
| Example 2 | 49.30 | 42.54 | 863 | 3.22 | 15.8 | 0.449 | 151.6 |
| Average | 49.9 | 36.81 | 739 | 3.44 | 13.15 | 0.450 | 151.2 |
| Comparative Example 2 | 42.4 | 62.44 | 1473 | 1.99 | 3.1 | 0.407 | 149.2 |
| Comparative Example 2 | 42.9 | 65.33 | 1523 | 1.47 | 3.1 | 0.415 | 148.4 |

TABLE 2

Polymerization Data Utilizing Catalyst Systems of Examples 3 and 4.

| Catalyst | Catalyst Amount (mg) | Productivity (g of polymer/g of cat * h) | Mw (×10$^5$) | Mw/Mn | Bulk Density |
|---|---|---|---|---|---|
| Example 3 | 24.7 | 1385 | 1.83 | 2.4 | 0.392 |
| Example 3 | 26.6 | 1525 | 1.82 | 2.3 | 0.407 |
| Average | 25.7 | 1455 | 1.83 | 2.4 | 0.400 |

TABLE 2-continued

Polymerization Data Utilizing Catalyst Systems of Examples 3 and 4.

| Catalyst | Catalyst Amount (mg) | Productivity (g of polymer/g of cat * h) | Mw (×10$^5$) | Mw/Mn | Bulk Density |
|---|---|---|---|---|---|
| Comparative Example 3 | 50.4 | 1284 | 1.62 | 2.3 | 0.344 |
| Comparative Example 3 | 50.2 | 1372 | 1.68 | 2.3 | 0.420 |
| Average | 50.3 | 1328 | 1.65 | 2.3 | 0.382 |
| Example 4 | 25.5 | 1765 | 1.79 | 2.47 | 0.200 |
| Example 4 | 25.7 | 1890 | 1.80 | 2.33 | 0.219 |
| Average | 25.6 | 1828 | 1.80 | 2.4 | 0.210 |
| Comparative Example 4 | 49.9 | 1497 | 1.80 | 2.26 | 0.224 |
| Comparative Example 4 | 50.0 | 1616 | 1.67 | 2.35 | 0.32 |
| Comparative Example 4 | 50.6 | 1547 | 1.71 | 2.38 | 0.231 |
| Average | 50.3 | 1581 | 1.69 | 2.37 | 0.276 |

TABLE 3

Polymerization Data Utilizing Catalyst Systems of Examples 5–11.

| Entry | Experiment Run # | Cat. Productivity (g pol./g cat. * hr) | Mw | Mw/Mn | 1-hexene (wt %) |
|---|---|---|---|---|---|
| Example 5 | | | | | |
| 1 | 1 | 1369 | 471092 | 1.8 | 3.0 |
| 2 | 1 | 1173 | 480211 | 1.8 | 2.9 |
| 3 | 1 | 1304 | 469675 | 1.8 | 3.2 |
| 4 | 1 | 1167 | 469675 | 1.7 | 3.4 |
| Average | | 1253 | 472663 | 1.8 | 3.1 |
| Std. Dev. | | 100 | 5076 | 0.0 | 0.2 |
| Comparative Example 5 | | | | | |
| 1 | 1 | 772 | 454217 | 1.8 | 3.7 |
| 2 | 1 | 792 | 474279 | 1.7 | 4.9 |
| 3 | 1 | 857 | 466496 | 1.8 | 3.2 |
| 4 | 1 | 781 | 471032 | 1.8 | 3.5 |
| Average | | 801 | 466506 | 1.8 | 3.8 |
| Std. Dev. | | 39 | 8793 | 0.0 | 0.7 |
| Example 5A | | | | | |
| 1 | 2 | 1811 | 481723 | 1.8 | 3.1 |
| 2 | 2 | 1331 | 481876 | 1.8 | 3.2 |
| 3 | 2 | 1556 | 474281 | 1.8 | 3.2 |
| 4 | 2 | 1339 | 471572 | 1.8 | 2.9 |
| Average | | 1509 | 477363 | 1.8 | 3.1 |
| Std. Dev. | | 226 | 5241 | 0.0 | 0.1 |
| Comparative Example 5A | | | | | |
| 1 | 2 | 1097 | 434245 | 1.9 | 3.3 |
| 2 | 2 | 1007 | 495291 | 1.9 | 5.5 |
| 3 | 2 | 1138 | 492116 | 1.8 | 3.0 |
| 4 | 2 | 964 | 492663 | 1.8 | 3.0 |
| Average | | 1051 | 478579 | 1.8 | 3.7 |
| Std. Dev. | | 80 | 29588 | 0.0 | 1.2 |
| Example 6 | | | | | |
| 1 | 3 | 5292 | 520003 | 1.6 | 2.9 |
| 2 | 3 | 5068 | 496885 | 1.7 | 2.9 |
| 3 | 3 | 4756 | 534374 | 1.6 | 3.0 |
| 4 | 3 | 4402 | 501231 | 1.7 | 2.9 |
| 5 | 3 | 4555 | 493529 | 1.6 | 2.9 |
| 6 | 3 | 3587 | 485147 | 1.7 | 2.8 |
| 7 | 3 | 3614 | 486929 | 1.7 | 2.7 |
| 8 | 3 | 3796 | 511650 | 1.6 | 2.6 |
| Average | | 4384 | 503719 | 1.6 | 2.8 |
| Std. Dev. | | 658 | 17119 | 0.0 | 0.1 |

TABLE 3-continued

Polymerization Data Utilizing Catalyst Systems of Examples 5–11.

| Entry | Experiment Run # | Cat. Productivity (g pol./g cat. * hr) | Mw | Mw/Mn | 1-hexene (wt %) |
|---|---|---|---|---|---|
| Comparative Example 6 | | | | | |
| 1 | 3 | 2617 | 516758 | 1.7 | 2.6 |
| 2 | 3 | 2398 | 500992 | 1.7 | 2.6 |
| 3 | 3 | 2448 | 511444 | 1.6 | 2.5 |
| 4 | 3 | 2273 | 522151 | 1.7 | 2.7 |
| 5 | 3 | 2920 | 496035 | 1.7 | 2.7 |
| 6 | 3 | 2807 | 505999 | 1.7 | 2.8 |
| 7 | 3 | 2947 | 505491 | 1.6 | 2.7 |
| 8 | 3 | 2685 | 492437 | 1.6 | 2.7 |
| Average | | 2637 | 506413 | 1.7 | 2.7 |
| Std. Dev. | | 249 | 10096 | 0.0 | 0.1 |
| Example 6A | | | | | |
| 1 | 2 | 3863 | 561682 | 1.8 | 3.1 |
| 2 | 2 | 3775 | 550256 | 1.7 | 2.9 |
| 3 | 2 | 3294 | 551118 | 1.8 | 3.0 |
| 4 | 2 | 3389 | 535516 | 1.7 | 2.8 |
| Average | | 3580 | 549643 | 1.8 | 3.0 |
| Std. Dev. | | 281 | 10756 | 0.1 | 0.1 |
| Comparative Example 6A | | | | | |
| 1 | 2 | 3476 | 528000 | 1.8 | 2.7 |
| 2 | 2 | 3430 | 533326 | 1.7 | 2.6 |
| 3 | 2 | 3335 | 553081 | 1.7 | 2.9 |
| 4 | 2 | 2936 | 545294 | 1.7 | 2.6 |
| Average | | 3294 | 539925 | 1.7 | 2.7 |
| Std. Dev. | | 246 | 11368 | 0.0 | 0.1 |
| Example 7 | | | | | |
| 1 | 2 | 2013 | 502994 | 1.8 | 3.1 |
| 2 | 2 | 1862 | 485244 | 1.8 | 3.8 |
| 3 | 2 | 1640 | 475691 | 1.7 | 2.9 |
| 4 | 2 | 1583 | 509755 | 1.8 | 3.2 |
| Average | | 1774 | 493421 | 1.8 | 3.2 |
| Std. Dev. | | 200 | 15702 | 0.0 | 0.4 |
| Comparative Example 7 | | | | | |
| 1 | 2 | 924 | 507816 | 1.9 | 3.2 |
| 2 | 2 | 1008 | 510590 | 1.8 | 3.2 |
| 3 | 2 | 904 | 507299 | 1.8 | 3.0 |
| Average | | 945 | 508569 | 1.8 | 3.1 |
| Std. Dev. | | 55 | 1770 | 0.0 | 0.1 |
| Example 8 | | | | | |
| 1 | 1 | 1453 | 493734 | 1.8 | 2.8 |
| 2 | 1 | 1505 | 493518 | 1.7 | 2.4 |
| 3 | 1 | 1372 | 482704 | 1.7 | 3.1 |
| 4 | 1 | 1306 | 475422 | 1.8 | 2.4 |
| Average | | 1409 | 486345 | 1.7 | 2.7 |
| Std. Dev. | | 88 | 8918 | 0.0 | 0.4 |
| Comparative Example 8 | | | | | |
| 1 | 1 | 353 | 478873 | 1.8 | 2.1 |
| 2 | 1 | 450 | 482745 | 1.8 | 3.3 |
| 3 | 1 | 420 | 494550 | 1.7 | 2.6 |
| 4 | 1 | 363 | 501746 | 1.8 | 2.5 |
| Average | | 397 | 489478 | 1.8 | 2.6 |
| Std. Dev. | | 46 | 10552 | 0.0 | 0.5 |
| Example 8A | | | | | |
| 1 | 2 | 2157 | 507686 | 1.8 | 3.0 |
| 2 | 2 | 1721 | 494956 | 1.8 | 3.1 |
| 3 | 2 | 1707 | 503188 | 1.7 | 3.0 |
| 4 | 2 | 1539 | 505394 | 1.7 | 2.8 |
| Average | | 1781 | 502806 | 1.8 | 3.0 |
| Std. Dev. | | 264 | 5546 | 0.1 | 0.1 |
| Comparative Example 8A | | | | | |
| 1 | 2 | 1352 | 503625 | 1.8 | 3.2 |
| 2 | 2 | 1294 | 506572 | 1.9 | 4.6 |

TABLE 3-continued

Polymerization Data Utilizing Catalyst Systems of Examples 5–11.

| Entry | Experiment Run # | Cat. Productivity (g pol./g cat. * hr) | Mw | Mw/Mn | 1-hexene (wt %) |
|---|---|---|---|---|---|
| 3 | 2 | 1290 | 507076 | 1.9 | 3.0 |
| 4 | 2 | 1277 | 508657 | 1.8 | 3.0 |
| Average | | 1303 | 506482 | 1.8 | 3.4 |
| Std. Dev. | | 33 | 2102 | 0.0 | 0.8 |
| Example 9 | | | | | |
| 1 | 1 | 790 | 465592 | 1.8 | 3.0 |
| 2 | 1 | 864 | 468323 | 1.8 | 2.6 |
| 3 | 1 | 997 | 474450 | 1.8 | 3.0 |
| 4 | 1 | 792 | 473548 | 1.7 | 3.0 |
| Average | | 861 | 470478 | 1.8 | 2.9 |
| Std. Dev. | | 97 | 4231 | 0.0 | 0.2 |
| Comparative Example 9 | | | | | |
| 1 | 1 | 432 | 484983 | 1.8 | 3.3 |
| 2 | 1 | 501 | 479745 | 1.8 | 3.0 |
| 3 | 1 | 493 | 483786 | 1.8 | 2.4 |
| 4 | 1 | 530 | 477329 | 1.8 | 2.8 |
| Average | | 489 | 481461 | 1.8 | 2.9 |
| Std. Dev. | | 41 | 3551 | 0.0 | 0.4 |
| Example 10 | | | | | |
| 1 | 1 | 884 | 460911 | 1.8 | 2.7 |
| 2 | 1 | 1012 | 456696 | 1.7 | 2.9 |
| 3 | 1 | 917 | 454551 | 1.7 | 3.0 |
| 4 | 1 | 880 | 460322 | 1.8 | 3.0 |
| Average | | 923 | 458120 | 1.8 | 2.9 |
| Std. Dev. | | 61 | 3022 | 0.0 | 0.1 |
| Comparative Example 10 | | | | | |
| 1 | 1 | 700 | 451451 | 1.7 | 5.2 |
| 2 | 1 | 632 | 468391 | 1.8 | 2.7 |
| 3 | 1 | 573 | 460098 | 1.8 | 2.7 |
| 4 | 1 | 561 | 465942 | 1.7 | 3.0 |
| Average | | 616 | 461470 | 1.8 | 3.4 |
| Std. Dev. | | 64 | 7531 | 0.0 | 1.2 |
| Example 11 | | | | | |
| 1 | 1 | 509 | 495767 | 1.7 | 2.4 |
| 2 | 1 | 563 | 487807 | 1.7 | 2.6 |
| 3 | 1 | 511 | 498420 | 1.7 | 2.4 |
| 4 | 1 | | 419219 | 1.8 | 3.0 |
| Average | | 528 | 475303 | 1.8 | 2.6 |
| Std. Dev. | | 31 | 37661 | 0.0 | 0.3 |
| Comparative Example 11 | | | | | |
| 1 | 1 | 491 | 469267 | 1.8 | 3.9 |
| 2 | 1 | 472 | 474899 | 1.8 | 10.8 |
| 3 | 1 | 411 | 488014 | 1.8 | 3.2 |
| 4 | 1 | 424 | 488569 | 1.8 | 2.4 |
| Average | | 450 | 480187 | 1.8 | 5.1 |
| Std. Dev. | | 38 | 9639 | 0.0 | 3.9 |

The invention claimed is:

1. A supported activator comprising an acidified ion-exchange layered silicate, an organoaluminun compound and a heterocyclic compound, wherein the heterocyclic compound may be substituted or unsubstituted.

2. The activator of claim 1 wherein the ion-exchange layered silicate is acidified by contacting with an acid.

3. The activator of claim 2 wherein the acid comprises one or more of sulfuric acid, hydrochloric acid, a carboxylic acid, an amino acid, or a mixture thereof.

4. The activator of claim 1 wherein the ion-exchange layered silicate has a surface area of 100 to 450 m$^2$/g.

5. The activator of claim 1 wherein the ion-exchange layered silicate has an atomic ratio (Al/Si) of aluminum and silicon of from 0.05 to 0.4.

6. The activator of claim 1 wherein the ion-exchange layered silicate is selected from the group consisting of: natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanernite, makatite, attapulgite, sepiolite, zeolitic layered materials, and mixtures thereof.

7. The activator of claim 1 wherein the ion-exchange layered silicate comprises a chemically treated smectite group silicate.

8. The activator of claim 1 wherein the ion-exchange layered silicate is treated with one or more of tetraethylammonium, tetramethylammonium, benzyltrimethylammonium, trimethylammonium, triethylammonium, tripropylammonium, tributylammonium, dodecylammonium, N,N- dimethylanilinium, N,N-diethylanilinium, N,N-2,4,5-pentamethylanilinium, N, N-dimethyloctadecylammonium octadecylammonium, N,N-dimethyl-p-n-butylanilinium, N,N-dimethyl-p-trimethylsilylanilinium N,N-dimethyl-1-napthylanilinium. N,N-2-trimethylanilinium, 2,6-dimethylanilinium, pyridinium, quinolinium N-methylpiperidinium, 2,6-dimethylpyridinium, 2,2,6,6-tetramethylpiperidinium, dimethyloxonium, diethyloxonium, diphenyloxonium, furanium, oxofuranium, tetraphenylphosphonium, phosphabenzonium, phosphanaphthalenium, hexafluorophosphate, tetrafluoroborate, or tetraphenylborate.

9. The activator of claim 1 wherein the ion-exchange layered silicate is treated with an organoaluminum compound, such that the ion-exchange layered silicate has aluminum alkyl groups bonded thereto.

10. The activator of claim 1 wherein the organoaluminum compound comprises an alkyl aluminum compound or alumoxane.

11. The activator of claim 1 wherein the organoaluminum compound comprises an alkyl aluminum compound, where the alkyl group(s) are C1 to C40 linear, branched or cyclic alkyls.

12. The activator of claim 1 wherein the organoaluminum compound comprises an alkyl aluminum compound, where the alkyl group(s) are selcted from the group consisting of methyl, ethyl, propyl, butyl, isobutyl, n-butyl, isopentyl, pentyl, hexyl, octyl, nonyl, decyl, and dodecyl.

13. The activator of claim 1 where the organoaluminum compound is represented by the formula $AlR_nY_{3-n}$ wherein each R is independently a substituted or unsubstituted alicyl group or C1-C40 linear, branched or cyclic substituted or unsubstituted aryl group.

14. The activator of claim 1 where the organoaluminum compound comprises one or more of trimethylaluminum, triethylaluminum, triisobutylaluminum, tri-n-hexylaluminum, tri-n-octylaluminum, tri-iso-octylaluminum, triphenylaluminum, triisobutyl aluminum, or tri-n-octyl aluminum.

15. The activator of claim 1 wherein the heterocyclic compound is selected from the group consisting of pyrroles, imidazoles, pyrazoles, pyrrolines, pyrrolidines, purines, carbazoles, indoles, phenyl indoles, 2,5-dimethyl-pyrroles, 3-pentaflurophenyl pyrrole, 4,5,6,7-tetrafluoroindole, 3,4-difluoropyrroles, and combinations thereof.

16. The activator of claim 1 wherein the heterocyclic compound is substituted with one or more halogen atoms or groups containing a halogen atom.

17. The activator of claim 16 wherein the halogen comprises chlorine, fluorine or bromine.

18. The activator of claim 1 where the heterocyclic compound is represented by the formula:

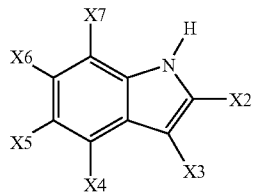

where each of X2, X3, X4, X5, X6, and X7 is independently hydrogen, halogen, an alkyl group, a halogenated or partially halogenated alkyl group, an aryl group, an alkoxide group, a halogenated or partially halogenated alkoxide group, an aryloxide group, a halogenated or partially halogenated aryloxide group, an aryl substituted alkyl group, or a halogenated or partially halogenated aryl substituted alkyl group.

19. The activator of claim 18 wherein the halogenated or partially halogenated group comprises a chlorine atom, a bromine atom or a fluorine atom.

20. The activator of claim 1 wherein the ion-exchange layered silicate is part of an agglomerate with at least one inorganic oxide component selected from $SiO_2$, $Al_2O_3$, MgO, $AlPO_4$, $TiO_2$, $ZrO_2$, or $Cr_2O_3$.

21. A catalyst system comprising an olefin polymerization catalyst compound and the activator of claim 1.

22. The catalyst system of claim 21 wherein the catalyst compound comprises a bridged bisindenyl transition metal compound.

23. The catalyst system of claim 21 wherein the catalyst compound comprises one or more of
rac-dimethylsilyl-bis(indenyl)hafniumdimethyl,
rac-dimethylsilyl-bis(indenyl)hafniumdichloride,
rac-dimethylsilyl-bis(indenyl)zirconiumdimethyl,
rac-dimethylsilyl-bis(indenyl)zirconiumdichloride,
rac-dimethylsilyl-bis(indenyl)(2-methyl-4-phenyl-indenyl)hafniumdimethyl,
rac-dimethylsilyl-bis(indenyl)(2-methyl-4-phenyl-indenyl) hafniumdichloride,
rac-dimethylsilyl-bis(indenyl)(2-methyl-4-phenyl-indenyl) zirconiumdimethyl,
rac-dimethylsilyl-bis(indenyl)(2-methyl-4-phenyl-indenyl) zirconiumdichloride,
rac-dimethylsilyl-bis(2-methyl-benzindenyl)hafniumdimethyl,
rac-dimethylsilyl-bis(2-methyl-benzindenyl) hafniumdichloride,
rac-dimethylsilyl-bis(2-methyl-benzindenyl) zirconiumdimethyl,
rac-dimethylsilyl-bis(2-methyl-benzindenyl) zirconiumdichloride,
rac-dimethylsilyl-bis-(2-methyl-indenyl) zirconiumdimethyl,
rac-dimethylsilyl-bis-(2-methyl-indenyl) hafniumdimethyl,
rac-dimethylsilyl-bis-(2-methyl-indenyl) hafniumdichloride,
rac-dimethylsilyl-bis-(2-methyl-indenyl) zirconiumdichloride,
rac-dimethylsilyl-bis(2-4-naphthyl-indenyl)hafniumdimethyl,
rac-dimethylsilyl-bis(2-4-naphthyl-indenyl) zirconiumdichloride,
rac-dimethylsilyl-bis(2-4-naphthyl-indenyl) hafniumdichloride,
rac-dimethylsilyl-bis(2-4-naphthyl-indenyl) zirconiumdimethyl,
rac-ethylene-bis(indenyl)hafniumdimethyl,
rac-ethylene-bis(indenyl)hafniumdichloride,
rac-ethylene-bis(indenyl)zirconiumdimethyl,
rac-ethylene-bis(indenyl)zirconiumdichloride,
rac-dimethylsilyl-bis(2-methyl-4-(2'-methyl-phenyl)-indenyl) hafniumdimethyl,
rac-dimethylsilyl-bis(2-methyl-4-(2'-methyl-phenyl)-indenyl) hafniumdichloride,
rac-dimethylsilyl-bis(2-methyl-4-(2'-methyl-phenyl)-indenyl) zirconiumdimethyl,
rac-dimethylsilyl-bis(2-methyl-4-(2'-methyl-phenyl)-indenyl) zirconium dichloride,
rac-dimethylsilyl-bis(2-methyl-4-(4'-methyl-phenyl)-indenyl)hafniumdimethyl, rac-dimethylsilyl-bis(2-methyl-4-(4'-methyl-phenyl)-indenyl)hafniumdichloride,
rac-dimethylsilyl-bis(2-methyl-4-(4'-methyl-phenyl)-indenyl)zirconium dimethyl,
rac-dimethylsilyl-bis(2-methyl-4-(4'-methyl-phenyl)-indenyl) zirconium dichloride,
rac-dimethylsilyl-bis(2-methyl-4-(4'-tert-butyl-phenyl)-indenyl)hafnium dimethyl,
rac-dimethylsilyl-bis(2-methyl-4-(4'-tert-butyl-phenyl)-indenyl)hafnium dichloride,
rac-dimethylsilyl-bis(2-methyl-4-(4'-tert-butyl-phenyl)-indenyl)zirconium dimethyl,
rac-dimethylsilyl-bis(2-methyl-4-(4'-tert-butyl-phenyl)-indenyl) zirconium dichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl-phenyl)-indenyl)hafniumdichloride,
rac-dimethylsilyl-bis(2-methyl-4-(4'-tert-butyl-phenyl)-indenyl)zirconiumdimethyl,
rac-dimethylsilyl-bis(2-methyl-4-(4'-tert-butyl-phenyl)-indenyl)zirconiumdichloride,
rac-dimethylsilyl-(2-methyl-4-(4'-tert-butyl-phenyl)-indenyl)(2-isoprpyl-4-(4'-tert-butyl-phenyl-)-indenyl) hafniumdimethyl,
rac-dimethylsilyl-(2-methyl-4-(4'-tert-butyl-phenyl)-indenyl)(2-isoprpyl-4-(4'-tert-butyl-phenyl-)-indenyl) hafniumdichloride,
rac-dimethylsilyl-(2-methyl-4-(4'-tert-butyl-phenyl)-indenyl)(2-isoprpyl-4-(4'-tert-butyl-phenyl-)-indenyl)zirconiumdichloride,
rac-dimethylsilyl-(2-methyl-4-(4'-tert-butyl-phenyl)-indenyl)(2-isoprpyl-4-(4'-tert-butyl-phenyl-)-indenyl)zirconiumdimethyl,
rac-dimethylsilyl-bis(2-methyl-4,6-diisopropyl-indenyl) hafniumdimethyl,
rac-dimethylsilyl-bis(2-methyl-4,6-diisopropyl-indenyl) zirconiumdimethyl,
rac-dimethylsilyl-bis(2-methyl-4,6-diisopropyl-indenyl) zirconiumdichloride,
rac-dimethylsilyl-bis(2-methyl-4,6-diisopropyl-indenyl) hafniumdichloride,
Bis(cyclopentadieneyl)zirconiumdichloride,
Bis(cyclopentadienyl)zirconiumdimethyl,
Bis(pentamethylcyclopentadiencyl)zirconiumdichloride,
Bis(pentamethylcyclopentadieneyl)zirconiumdimethyl,
Bis(cyclopentadieneyl)(pentamethylcyclopentadienyl)zirconiumdichloride,
Bis(cyclopentadienyl)(pentamethylcyclopentadienyl)zirconiumdimethyl,
Bis(1-methyl,4-butylcyclopentadienyl)zirconiumdichloride,
Bis(1-methyl,4-butylcyclopentadienyl)zirconiumdimethyl,
Bis(1-methyl,4-butylcyclopentadienyl)ziconiumdimethoxide,
Bis(1-methyl,4-butylcyclopentadienyl)zirconiumdibenzyl,
Bis(1-methyl,4-butylcyclopentadienyl)zirconiumdifluoride,
Bis(1-methyl,4-butylcyclopentadienyl)zirconiumdiamide,
Bis(1-methyl,4-ethylcyclopentadienyl)zirconiumdichloride,
Bis(1-methyl,4-ethylcyclopentadienyl)zirconiumdimethyl,
Bis(1-methyl,4-benzylcyclopentadienyl)zirconiumdichloride,
Bis(1-methyl,4-benzylcyclopentadienyl)zirconiumdimethyl,
Bis(1-methyl,3-butylcyclopentadienyl)zirconiumdichloride,
Bis(1-methyl,3-butylcyclopentadienyl)zirconiumdimethyl,
Bis(1-methyl,3-n-propylcyclopentadienyl)zirconiumdichloride,
Bis(1-methyl,3-n-propylcyclopentadienyl)zirconiumdimethyl,
Bis(1-methyl,3-iso-propylcyclopentadienyl)zirconiumdichloride,
Bis(1-methyl,3-iso-propylcyclopentadienyl)zirconiumdimethyl,
Bis(1,3-dimethylcyclopentadienyl)zirconiumdichloride,
Bis(1,3-dimethylcyclopentadienyl)zirconiumdimethyl,
Bis(n-propylcyclopentadienyl)zirconiumdichloride,
Bis(n-propylcyclopentadienyl)zirconiumdimethyl,
Bis(n-propylcyclopentadienyl)zirconiumdifluoride,
Bis(n-propylcyclopentadienyl)zirconiumdiamide,
Bis(n-propylcyclopentadienyl)zirconiumdibenzyl,
Bis(n-propylcyclopentadienyl)zirconiumdimethoxide,
Bis(n-propylcyclopentadienyl)hafniumdichloride,
Bis(n-propylcyclopentadienyl)hafniumdimethyl,
Bis(n-propylcyclopentadienyl)hafniumdifluoride,
Bis(n-propylcyclopentadienyl)hafniumdiamide,
Bis(n-propylcyclopentadienyl)hafniumdibenzyl,
Bis(n-propylcyclopentadienyl)hafniumdimethoxide,
Bis(n-butylcyclopentadienyl)zirconiumdichloride,
Bis(n-butylcyclopentadienyl)zirconiumdimethyl,
Bis(tert-butylcyclopentadienyl)zirconiumdichloride,
Bis(tert-butylcyclopentadienyl)zirconiumdimethyl,
Bis(benzylcyclopentadienyl)zirconiumdichloride,
Bis(benzylcyclopentadienyl)zirconiumdimethyl,
Bis(benzylcyclopentadienyl)(pentamethylcyclopentadienyl)zirconiumdimethyl,
Bis(benzylcyclopentadienyl)(pentamethylcyclopentadienyl)zirconiumdichloride,
Bis(propylcyclopentadienyl)(pentamethylcyclopentadienyl)zirconiumdimethyl,
Bis(propylcyclopentadienyl)(pentamethylcyclopentadienyl)zirconiumdichloride,
Bis(propylcyclopentadienyl)(pentamethylcyclopentadienyl)zirconiumdimethyl,
Bis(propylcyclopentadienyl)(pentamethylcyclopentadienyl)zirconiumdichloride,
Bis(tetramethyl,propylcyclopentadienyl)(pentamethylcyclopentadienyl)zirconium dimethyl,
Bis(tetramethyl,propylcyclopentadienyl)(pentamethylcyclopentadienyl)zirconium dichloride,
Bis(tetramethyl,propylcyclopentadienyl)cyclopentadienyl)zirconiumdimethyl,
Bis(tetramethyl,propylcyclopentadienyl)cyclopentadienyl)zirconiumdichloride,
Dimethysilybis(cyclopentadienyl)zirconiumdichloride,
Dimethysilybis(cyclopentadienyl)zirconiumdimethyl,
Dimethysilybis(cyclopentadienyl)zirconiumdimethoxide,
Dimethysilybis(cyclopentadienyl)zirconiumdiamide,
Dimethysilybis(cyclopentadienyl)zirconiumdifluoride,
Dimethysilybis(cyclopentadienyl)zirconiumdiiodide,
Dimethysilybis(cyclopentadienyl)zirconiumdibromide,
Dimethysilybis(pentamethylcyclopentadienyl)zirconiumdichloride,
Dimethylsilylbis(pentamethylcyclopentadienyl)zirconiumdimethyl, Dimethylsilylbis((pentamethylcyclopentadienyl)zirconiumdifluoride,
Dimethylsilylbis(pentamethylcyclopentadienyl)zirconiumdimethoxide,
Dimethylsilylbis(pentamethylcyclopentadienyl)zirconiumdiamide,
Dimethylsilylbis(pentamethylcyclopentadienyl)zirconiumdibromide,
Dimethylsilylbis(pentamethylcyclopentadienyl)zirconiumdibenzyl,
Dimethylsilylbis(cyclopentadienyl)(pentamethylcyclopentadienyl)zirconium dichloride,
Dimethylsilylbis(cyclopentadienyl)(pentamethylcyclopentadienyl)zirconium dimethyl,
Dimethylsilylbis(cyclopentadienyl)(pentamethylcyclopentadienyl)zirconium dimethoxide,
Dimethylsilylbis(cyclopentadienyl)(pentamethylcyclopentadienyl)zirconium dibromide,
Dimethylsilylbis(cyclopentadienyl)(pentamethylcyclopentadienyl)zirconium diamide,
Dimethylsilylbis(cyclopentadienyl)(pentamethylcyclopentadienyl)zirconium difluoride,
Dimethylsilylbis(cyclopentadienyl)(pentamethylcyclopentadienyl)zirconium dibenzyl,
Dimethylsilylbis(1-methyl,4-butylcyclopentadienyl)zirconiumdichloride,
Dimethylsilylbis(1-methyl,4-butylcyclopentadienyl)zirconiumdimethyl,
Dimethylsilylbis(1-methyl,4-butylcyclopentadienyl)zirconiumdimethoxide,
Dimethylsilylbis(1-methyl,4-butylcyclopentadienyl)zirconiumdibromide,
Dimethylsilylbis(1-methyl,4-butylcyclopentadienyl)zirconiumdifluoride,
Dimethylsilylbis(1-methyl,4-butylcyclopentadienyl)zirconiumdiamide,
Dimethylsilylbis(1-methyl,4-butylcyclopentadienyl)zirconiumdimethoxide,
Dimethylsilylbis(1-methyl,4-butylcyclopentadienyl)zirconiumdibenzyl,
Dimethylsilylbis(1-methyl,4-ethylcyclopentadienyl)zirconiumdichloride,
Dimethylsilylbis(1-methyl,4-ethylcyclopentadienyl)zirconiumdimethyl,
Dimethylsilylbis(1-methyl,4-benzylcyclopentadienyl)zirconiumdichloride,
Dimethylsilylbis(1-methyl,4-benzylcyclopentadienyl)zirconiumdimethyl,
Dimethylsilylbis(1-methyl,3-butylcyclopentadienyl)zirconiumdichloride,
Dimethylsilylbis(1-methyl,3-butylcyclopentadienyl)zirconiumdimethyl,
Dimethylsilylbis(1-methyl,3-n-propylcyclopentadienyl)zirconiumdichloride,
Dimethylsilylbis(1-methyl,3-n-propylcyclopentadienyl)zirconiumdimethyl,
Dimethylsilylbis(1-methyl,3-iso-propylcyclopentadienyl)zirconiumdichloride,
Dimethylsilylbis(1-methyl,3-iso-propylcyclopentadienyl)zirconiumdimethyl,
Dimethylsilylbis(1,3-dimethylcyclopentadienyl)zirconiumdichloride,
Dimethylsilylbis(1,3-dimethylcyclopentadienyl)zirconiumdimethyl,
Dimethylsilylbis(n-propylcyclopentadienyl)zirconiumdichloride,
Dimethylsilylbis(n-propylcyclopentadienyl)zirconiumdimethyl,
Dimethylsilylbis(n-butylcyclopentadienyl)zirconiumdichloride,
Dimethylsilylbis(n-butylcyclopentadienyl)zirconiumdimethyl,
Dimethylsilylbis(tert-butylcyclopentadienyl)zirconiumdichloride,
Dimethylsilylbis(tert-butylcyclopentadienyl)zirconiumdimethyl,
Dimethylsilylbis(benzylcyclopentadienyl)zirconiumdichloride,
Dimethylsilylbis(benzylcyclopentadienyl)zirconiumdimethyl,
Dimethylsilylbis(benzylcyclopentadienyl)(pentamethylcyclopentadienyl) zirconium dimethyl,
Dimethylsilylbis(benzylcyclopentadienyl)(pentamethylcyclopentadienyl) zirconium dichloride,
Dimethylsilylbis(propylcyclopentadienyl)(pentamethylcyclopentadienyl) zirconiumdimethyl,
Dimethylsilylbis(propylcyclopentadienyl)(pentamethylcyclopentadienyl) zirconiumdichloride,
Dimethylsilylbis(propylcyclopentadienyl)tetramethylcyclopentadienyl) zirconiumdimethyl,
Dimethylsilylbis(propylcyclopentadienyl)(tetramethylcyclopentadienyl) zirconiumdichloride,
Dimethylsilylbis(tetramethyl,propylcyclopentadienyl)(pentamethyl cyclopentadienyl) zirconium dimethyl,
Dimethylsilylbis(tetramethyl,propylcyclopentadienyl)(pentamethyl cyclopentadienyl) zirconium dichloride,
Dimethylsilylbis(tetramethyl,propylcyclopentadienyl)(cyclopentadienyl) zirconium dimethyl, or
Dimethylsilylbis(tetramethyl,propylcyclopentadienyl)(cyclopentadienyl) zirconium dichloride.

24. The catalyst system of claim 21 wherein the catalyst compound comprises $(1,3\text{-MeBuCp})_2\text{ZrMe}_2$.

25. The catalyst system of claim 21 wherein the catalyst compound comprises rac-dimethylsilylbis[(2-methyl-4-phenyl)indenyl] zirconiumdimethyl.

26. The catalyst system of claim 21 wherein the catalyst compound comprises rac-dimethylsilylbis[(2-methyl)indenyl] zirconiumdimethyl.

27. The catalyst system of claim 21 wherein at least two different catalyst compounds are present.

28. A method to polymerize olefins comprising contacting the olefins with the catalyst system of claim 21.

29. The method of claim 28 where the olefins comprise ethylene.

30. The method of claim 28 where the olefins comprise propylene.

31. The method of claim 28 wherein the olefins comprise ethylene and propylene.

32. The method of claim 28 wherein the olefins comprise ethylene and a comonomer selected from the group consisting of propylene, butene, pentene, hexene, heptene, octene, nonene, decene, undecene, dodecene, hexadecene, 4-methylpentene-1,3-methylpentene-1,3,5,5-trimethylhexene-1,5-ethylnonene-1, and isomers thereof.

33. The method of claim 28 wherein the olefins comprise propylene and a comonomer selected from the group consisting of ethylene, butene, pentene, hexene, heptene, octene, nonene, decene, undecene, dodecene, hexadecene, 4-methylpentene-1,3-methylpentene-1,3,5,5-trimethyl hexene-1,5-ethylnonene-1, and isomers thereof.

34. The method of claim 28 wherein the polymerization occurs in the gas phase.

35. The method of claim 28 wherein where the polymerization occurs in the slurry phase.

* * * * *